United States Patent
Tsai et al.

(10) Patent No.: US 12,369,164 B2
(45) Date of Patent: Jul. 22, 2025

(54) METHOD AND USER EQUIPMENT FOR SMALL DATA TRANSMISSION

(71) Applicant: SHARP KABUSHIKI KAISHA, Sakai (JP)

(72) Inventors: Hsin-Hsi Tsai, Taipei (TW); Heng-Li Chin, Taipei (TW); Yung-Lan Tseng, Taipei (TW); Hai-Han Wang, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 361 days.

(21) Appl. No.: 17/966,160

(22) Filed: Oct. 14, 2022

(65) Prior Publication Data

US 2023/0122869 A1     Apr. 20, 2023

Related U.S. Application Data

(60) Provisional application No. 63/255,877, filed on Oct. 14, 2021.

(51) Int. Cl.
| | | |
|---|---|---|
| *H04W 72/23* | (2023.01) | |
| *H04L 1/1812* | (2023.01) | |
| *H04W 76/20* | (2018.01) | |
| *H04W 76/38* | (2018.01) | |

(52) U.S. Cl.
CPC .......... *H04W 72/23* (2023.01); *H04L 1/1812* (2013.01); *H04W 76/20* (2018.02); *H04W 76/38* (2018.02)

(58) Field of Classification Search
CPC ..... H04W 72/23; H04W 76/20; H04W 76/38; H04W 56/0045; H04W 76/27; H04L 1/1812; H04L 1/1835; H04L 1/1848; H04L 1/1861
See application file for complete search history.

(56) References Cited

U.S. PATENT DOCUMENTS

| | | | | |
|---|---|---|---|---|
| 2021/0410180 A1* | 12/2021 | Tsai | ............... | H04L 1/1819 |
| 2022/0210860 A1* | 6/2022 | Chin | ............... | H04W 72/23 |
| 2022/0232659 A1* | 7/2022 | Kim | ............... | H04W 76/28 |
| 2022/0330374 A1* | 10/2022 | Kim | ............... | H04W 76/27 |
| 2022/0369264 A1* | 11/2022 | Cheng | ............... | H04W 56/0055 |

(Continued)

OTHER PUBLICATIONS

3GPP TS 38.300 V16.6.0 (Jun. 2021), 3rd Generation Partnership Project; Technical Specification Group Radio Access Network; NR; NR and NG-RAN Overall Description;Stage 2 (Release 16).

(Continued)

*Primary Examiner* — Abdullahi Ahmed
(74) *Attorney, Agent, or Firm* — ScienBiziP, P.C.

(57) ABSTRACT

A method and a user equipment (UE) for small data transmission (SDT) are provided. The method includes: receiving, from a base station (BS), a common time alignment (TA) timer configured via system information; receiving, from the BS, a configured grant (CG)-SDT-specific TA timer configured via a CG-SDT-specific configuration; and determining whether to maintain or release a physical uplink control channel (PUCCH) based on the expirations of the common TA timer and the CG-SDT-specific TA timer, wherein the PUCCH is maintained if the UE determines that the CG-SDT-specific TA timer has expired, and the PUCCH is released if the UE determines that the common TA timer has expired.

20 Claims, 6 Drawing Sheets

(56) References Cited

U.S. PATENT DOCUMENTS

| | | | |
|---|---|---|---|
| 2023/0040421 A1* | 2/2023 | Tsai | H04W 72/115 |
| 2023/0044028 A1* | 2/2023 | Tsai | H04W 74/006 |
| 2024/0107522 A1* | 3/2024 | Babaei | H04W 72/1268 |
| 2024/0147348 A1* | 5/2024 | Kaikkonen | H04W 76/20 |
| 2024/0187927 A1* | 6/2024 | Laselva | H04W 28/0278 |

OTHER PUBLICATIONS

3GPP TS 38.331 V16.5.0 (Jun. 2021), 3rd Generation Partnership Project; Technical Specification Group Radio Access Network; NR; Radio Resource Control (RRC) protocol specification (Release 16).

3GPP TS 38.321 V16.5.0 (Jun. 2021), 3rd Generation Partnership Project; Technical Specification Group Radio Access Network; NR; Medium Access Control (MAC) protocol specification (Release 16).

3GPP TS 38.212 V16.6.0 (Jun. 2021), 3rd Generation Partnership Project; Technical Specification Group Radio Access Network; NR; Multiplexing and channel coding (Release 16).

3GPP TS 38.213 V16.6.0 (Jun. 2021), 3rd Generation Partnership Project; Technical Specification Group Radio Access Network; NR; Physical layer procedures for control (Release 16).

3GPP TS 38.214 V16.6.0 (Jun. 2021), 3rd Generation Partnership Project; Technical Specification Group Radio Access Network; NR; Physical layer procedures for data (Release 16).

3GPP TS 38.322 V16.2.0 (Dec. 2020), 3rd Generation Partnership Project; Technical Specification Group Radio Access Network; NR; Radio Link Control (RLC) protocol specification (Release 16).

3GPP TS 38.323 V16.5.0 (Sep. 2021), 3rd Generation Partnership Project; Technical Specification Group Radio Access Network; NR; Packet Data Convergence Protocol (PDCP) specification (Release 16).

* cited by examiner

METHOD AND USER EQUIPMENT FOR SMALL DATA TRANSMISSION

CROSS-REFERENCE TO RELATED APPLICATION(S)

The present disclosure claims the benefit of and priority to U.S. Provisional Patent Application Ser. No. 63/255,877, filed on Oct. 14, 2021, entitled "PUCCH FOR SMALL DATA TRANSMISSION", the contents of which are hereby incorporated fully by reference into the present disclosure for all purposes.

FIELD

The present disclosure is related to wireless communication and, more particularly, to a method and a user equipment (UE) for small data transmission (SDT) in the next generation wireless communication networks.

BACKGROUND

Various efforts have been made to improve different aspects of wireless communication for cellular wireless communication systems, such as 5G New Radio (NR), by improving data rate, latency, reliability, and mobility. The 5G NR system is designed to provide flexibility and configurability to optimize network services and types, accommodating various use cases such as enhanced Mobile Broadband (eMBB), massive Machine-Type Communication (mMTC), and Ultra-Reliable and Low-Latency Communication (URLLC). As the demand for radio access continues to increase, however, there exists a need for further improvements in the art.

SUMMARY

The present disclosure is related to a method and a user equipment for small data transmission (SDT) in next generation wireless communication networks.

In a first aspect of the present disclosure, a method performed by a user equipment (UE) for small data transmission (SDT) is provided. The method includes: receiving, from a base station (BS), a common time alignment (TA) timer configured via system information; receiving, from the BS, a configured grant (CG)-SDT-specific TA timer configured via a CG-SDT-specific configuration; and determining whether to maintain or release a physical uplink control channel (PUCCH) based on the expirations of the common TA timer and the CG-SDT-specific TA timer, wherein the PUCCH is maintained if the UE determines that the CG-SDT-specific TA timer has expired, and the PUCCH is released if the UE determines that the common TA timer has expired.

In an implementation of the first aspect of the present disclosure, the method further includes notifying, by a medium access control (MAC) layer of the UE, a radio resource control (RRC) layer of the UE to release the PUCCH in a case the UE determines that the common TA timer has expired.

In another implementation of the first aspect of the present disclosure, the method further includes flushing all hybrid automatic repeat request (HARQ) buffers in a case the UE determines that either of the common TA timer or the CG-SDT-specific TA timer has expired.

In another implementation of the first aspect of the present disclosure, the method further includes determining whether to generate an acknowledgement of data based on the common TA timer and the CG-SDT-specific TA timer; generating the acknowledgement of the data in a case the UE determines that either of the common TA timer or the CG-SDT-specific TA timer is running; and not generating the acknowledgement of the data in a case the UE determines that none of the common TA timer and the CG-SDT-specific TA timer is running.

In another implementation of the first aspect of the present disclosure, the method further includes instructing, by a medium access control (MAC) layer of the UE, a physical layer of the UE to generate the acknowledgement of the data in a case the UE determines that either of the common TA timer or the CG-SDT-specific TA timer is running.

In another implementation of the first aspect of the present disclosure, the method further includes transitioning to a radio resource control (RRC)_IDLE state in a case the UE determines that the CG-SDT-specific TA timer has expired.

In another implementation of the first aspect of the present disclosure, the system information is configured via an information element (IE) UplinkConfigCommonSIB.

In another implementation of the first aspect of the present disclosure, the CG-SDT-specific configuration is included in an SDT configuration.

In another implementation of the first aspect of the present disclosure, the SDT configuration is included in a suspend configuration.

In another implementation of the first aspect of the present disclosure, the suspend configuration is included in a radio resource control (RRC) release message.

In a second aspect of the present disclosure, a UE for small data transmission (SDT) is provided. The UE includes one or more non-transitory computer-readable media having computer-executable instructions embodied thereon; and at least one processor coupled to the one or more non-transitory computer-readable media. The at least one processor is configured to execute the computer-executable instructions to: receive, from a base station (BS), a common time alignment (TA) timer configured via system information; receive, from the BS, a configured grant (CG)-SDT-specific TA timer configured via a CG-SDT-specific configuration; and determine whether to maintain or release a physical uplink control channel (PUCCH) based on the expirations of the common TA timer and the CG-SDT-specific TA timer, wherein the PUCCH is maintained if the UE determines that the CG-SDT-specific TA timer has expired, and the PUCCH is released if the UE determines that the common TA timer has expired.

BRIEF DESCRIPTION OF THE DRAWINGS

Aspects of the disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
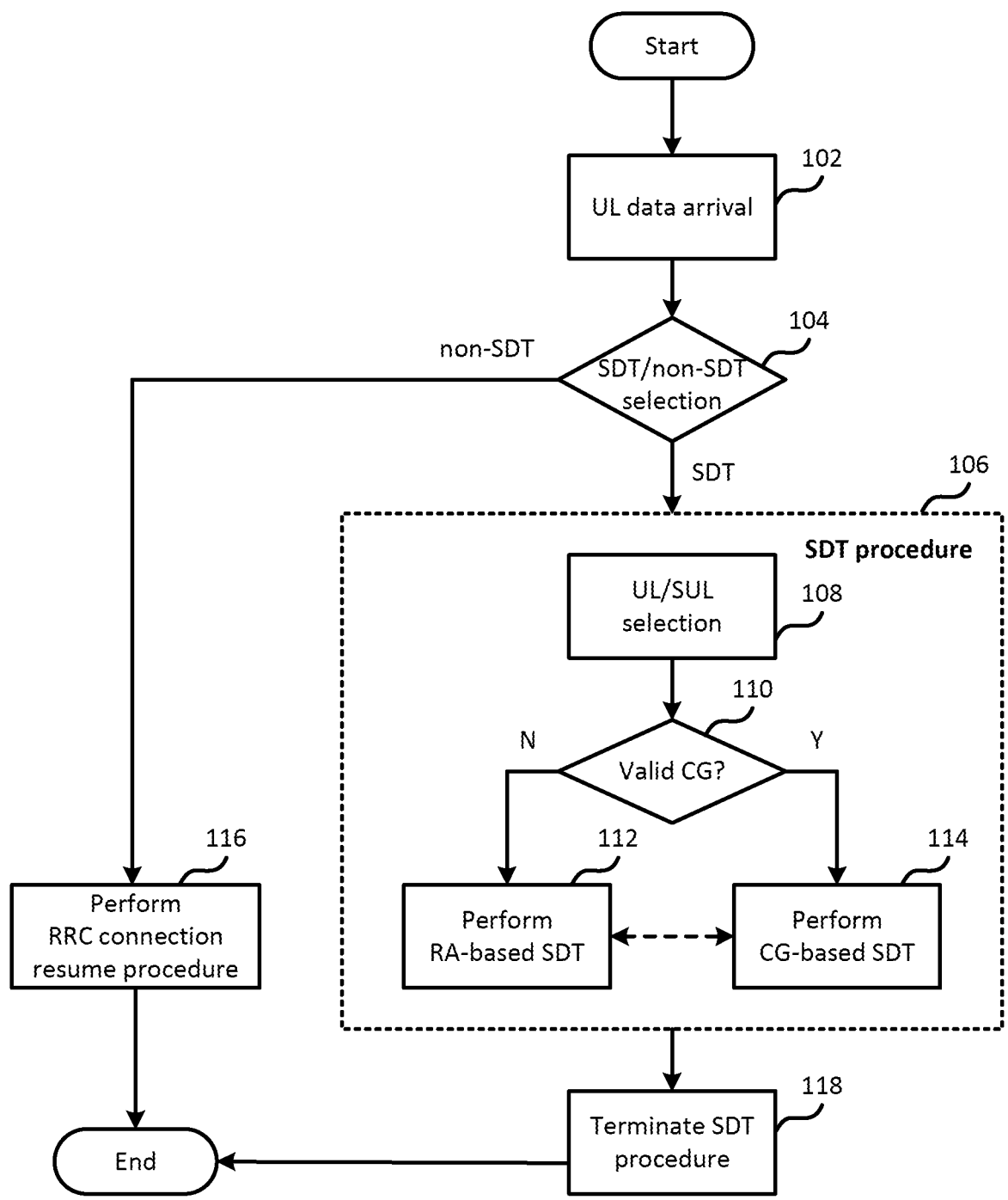
FIG. 1 is a flowchart diagram illustrating an SDT procedure, according to an example implementation of the present disclosure.

Some of the acronyms used in the present application are defined as follows, unless otherwise specified:

| Acronym | Full name |
| --- | --- |
| 3GPP | 3$^{rd}$ Generation Partnership Project |
| 5G | 5$^{th}$ generation |
| 5GC | 5G Core |
| Alt | Alternative |
| ACK | Acknowledge |
| AS | Access Stratum |
| BS | Base Station |
| BSR | Buffer Status Report |
| BWP | Bandwidth Part |
| CBRA | Contention Based Random Access |
| CCCH | Common Control Channel |
| CE | Control Element |
| CFRA | Contention Free Random Access |
| CG | Configured Grant |
| CORESET | Control Resource Set |
| C-RNTI | Cell-Radio Network Temporary Identifier |
| CS | Cyclic Shift |
| CSI | Channel State Information |
| CS-RNTI | Configured Scheduling RNTI |
| CSS | Common Search Space |
| DCI | Downlink Control Information |
| DFI | Downlink Feedback Information |
| DG | Dynamic Grant |
| DL | Downlink |
| DMRS | Demodulation Reference Signal |
| DRB | Data Radio Bearer |
| DRX | Discontinuous Reception |
| FR | Frequency Range |
| HARQ | Hybrid Automatic Repeat reQuest |
| IE | Information Element |
| LCH | Logical Channel |
| LCP | Logical Channel Prioritization |
| MAC | Medium Access Control |
| MCG | Master Cell Group |
| MPE | Maximum Permissible Exposure |
| Msg | Message |
| NACK | Non-Acknowledge |
| NAS | Non-Access Stratum |
| NR | New Radio |
| NW | Network |
| NUL | Normal Uplink |
| PCell | Primacy Cell |
| PDCCH | Physical Downlink Control Channel |
| PDSCH | Physical Downlink Shared Channel |
| PDU | Protocol Data Unit |
| PHR | Power Headroom Reporting |
| PHY | Physical Layer |
| PRACH | Physical Random Access Channel |
| PRB | Physical Resource Block |
| PUCCH | Physical Uplink Control Channel |
| PUSCH | Physical Uplink Shared Channel |
| QCL | Quasi Co Location |
| RA | Random Access |
| RACH | Random Access Channel |
| RAR | Random Access Response |
| RB | Radio Bearer |
| Rel | Release |
| RLC | Radio Link Control |
| RNA | RAN notification area |

-continued

| Acronym | Full name |
| --- | --- |
| RNTI | Radio Network Temporary Identifier |
| RO | RACH Occasion |
| RRC | Radio Resource Control |
| RS | Reference Signal |
| RSRP | Reference Signal Received Power |
| Rx | Reception |
| SCell | Secondary Cell |
| SCG | Secondary Cell Group |
| SCS | Subcarrier Spacing |
| SDT | Small Data Transmission |
| SDU | Service Data Unit |
| SI | System Information |
| SIB | System Information Block |
| SPS | Semi-Persistent Scheduling |
| SRB | Signaling Radio Bearer |
| SR | Scheduling Request |
| SRS | Sounding Reference Signal |
| SS | Search Space |
| SSB | SS/PBCH Block |
| SS-RSRP | Synchronization Signal-RSRP |
| SUL | Supplementary Uplink |
| TA | Timing Alignment or Time Advance |
| TAG | Timing Advance Group |
| TAT | Timing Alignment Timer |
| TCI | Transmission Configuration Indicator |
| TS | Technical Specification |
| Tx | Transmission |
| TBS | Transport Block Size |
| TRP | Transmission and Reception Point |
| UCI | Uplink Control Information |
| UE | User Equipment |
| UL | Uplink |
| USS | UE-specific Search Space |

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art. Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof. A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s). The microprocessors or general-purpose computers may include Application-Specific Integrated Circuits (ASICs), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure.

The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture, such as a Long-Term Evolution (LTE) system, an LTE-Advanced (LTE-A) system, an LTE-Advanced Pro system, or a 5G NR Radio Access Network (RAN), typically includes at least one base station (BS), at least one UE, and one or more optional network elements that provide connection within a network. The UE communicates with the network, such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

A BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage. Each cell (often referred to as a serving cell) may provide services to one or more UEs within its radio coverage such that each cell schedules the DL and optionally UL resources to at least one UE within its radio coverage for DL and optionally UL packet transmissions. The BS can communicate with one or more UEs in the radio communication system via the plurality of cells. A cell may allocate sidelink (SL) resources for supporting Proximity Service (ProSe) or Vehicle to Everything (V2X) service. Each cell may have overlapped coverage areas with other cells.

As discussed above, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate, and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used. Additionally, two coding schemes are considered for NR, specifically Low-Density Parity-Check (LDPC) code and Polar Code. The coding scheme adaption may be configured based on channel conditions and/or service applications.

Moreover, it is also considered that in a transmission time interval TX of a single NR frame, downlink (DL) transmission data, a guard period, and uplink (UL) transmission data should at least be included, where the respective portions of the DL transmission data, the guard period, and the UL transmission data should also be configurable, for example, based on the network dynamics of NR. In addition, sidelink resources may also be provided in an NR frame to support ProSe services.

In addition, the terms "system" and "network" herein may be used interchangeably. The term "and/or" herein is only an association relationship for describing associated objects and represents that these relationships may exist. For example, A and/or B may indicate that: A exists alone, A and B exist at the same time, or B exists alone. In addition, the character "/" herein generally represents that the former and latter associated objects are in an "or" relationship.

Examples of some selected terms used in this disclosure are provided, as follows.

User Equipment (UE): A UE may also be referred to as a PHY/MAC/RLC/PDCP/SDAP/RRC/AS/NAS layer/entity. The PHY/MAC/RLC/PDCP/SDAP/RRC/AS/NAS layer/entity may also be referred to as the UE.

Network (NW): An NW may include a network node, a TRP, a cell (e.g., SpCell, PCell, PSCell, and/or SCell), an eNB, a gNB, and/or a base station (BS).

Serving Cell: A serving cell may include a PCell, a PSCell, or an SCell. A serving cell may also include an activated or a deactivated serving cell.

Special Cell (SpCell): For a DC operation, an SpCell may be referred to as a PCell of an MCG or a PSCell of an SCG depending on whether the MAC entity (e.g., of the UE) is associated with the MCG or the SCG, otherwise, the SpCell may be referred to as the PCell.

Common/Dedicated configuration: A common configuration may be referred to as a cell-specific configuration, and a dedicated configuration may be referred to as a UE-specific configuration. The common parameters of an initial bandwidth part of a PCell may be provided via system information. For all other serving cells, the network may provide the common parameters via dedicated signaling.

The terms "RA-based SDT" and "RA-SDT" may be interchangeably used in some implementations of the present disclosure. The terms "CG-based SDT" and "CG-SDT" may be interchangeably used in some implementations of the present disclosure. The terms "initiate," "trigger," "apply," "store," "perform" and "start" may be interchangeably used in some implementations of the present disclosure. The terms "terminate," "stop," "release," "suspend," "discard," "end," "complete," "abort," and "cancel" may be interchangeably used in some implementations of the present disclosure. The terms "period," "process," "phase," and "duration" may be interchangeably used in some implementations of the present disclosure. The terms "resource," "occasion," and "configuration" may be interchangeably used in some implementations of the present disclosure. The terms "ongoing," "running," and "pending" may be interchangeably used in some implementations of the present disclosure. The terms "beam," "SSB," and "CSI-RS" may be interchangeably used in some implementations of the present disclosure. The terms "select," "consider" and "determine" may be interchangeably used in some implementations of the present disclosure.

Small Data Transmission (SDT)

In NR, until 3GPP release 16 (Rel-16), an RRC_INACTIVE state may not support data transmission (e.g., UL data transmission on a PUSCH and/or DL data transmission on a PDSCH). Hence, the UE may have to resume the connection (e.g., transition to the RRC_CONNECTED state) for any DL reception and/or UL data transmission. The connection setup and subsequently release to the RRC_INACTIVE state may happen for each data transmission regardless of how small and infrequent the data packets are. This may result in unnecessary power consumption and signaling overhead. The signaling overhead for the RRC_INACTIVE state UEs due to transmission of small data packets may be a general problem and may become a critical issue as the number of UEs increases in NR, not only for network performance and efficiency, but also for the UE's battery performance. In general, any device that has intermittent transmission of small data packets in the RRC_INACTIVE state may benefit from enabling small data transmission in the RRC_INACTIVE state. The key enablers for small data transmission in NR, namely the RRC_INACTIVE state, 2-step RACH, 4-step RACH, and/or configured grant type-1 have already been specified as part of legacy.

A Small Data Transmission (SDT) may be a procedure that allows data transmission while the UE is remaining in the RRC_INACTIVE state (e.g., without transitioning to the RRC_CONNECTED state). The SDT may be enabled on a radio bearer (RB) basis and may be initiated by the UE only if (i) less than a configured amount of UL data awaits transmission across all radio bearers (e.g., SRBs and/or DRBs) for which SDT is enabled, (ii) measured RSRP in the cell is above a configured threshold, and (iii) a valid resource for SDT is available.

An SDT procedure may be configured to either take place on the RACH (e.g., RA-based SDT, and configured via system information) or via type 1 CG resources (e.g., CG-based SDT, and configured via dedicated signaling in RRC Release message). The SDT resources may be configured on the initial BWP or for CG, additionally, on a dedicated BWP. For RACH, the network may also configure whether the 2-step or 4-step RA types can be used. When both the 2-step and 4-step RA types can be used, the UE may select the RA type. When only the 2-step RA can be used, the SDT may only be initiated if the criteria to select a 2-step RA type is also met.

Once the SDT is initiated, an SDT procedure may last as long as the UE is not explicitly directed to an RRC_IDLE state or an RRC_INACTIVE state (e.g., via an RRC Release message) or to an RRC_CONNECTED state (e.g., via an RRC Resume message). The SDT procedure ends and the UE may transition to the RRC_IDLE state when at least one of the following conditions are met (i) the UE performed cell re-selection, (ii) expiry of the SDT failure detection timer, or (iii) an RLC entity reaching a configured maximum retransmission threshold.

After initialing the SDT transmission, subsequent transmissions may be handled differently depending on the type of resources configured. When the CG resources are used, the network may schedule a subsequent UL transmission using dynamic grants or the subsequent UL transmission may take place on the next CG resource occasions. The DL transmissions may be scheduled using dynamic assignments. When the RACH resources are used, the network may schedule subsequent UL and DL transmissions using dynamic grants and/or assignments, respectively, after the completion of the RA procedure.

FIG. 1 is a flowchart diagram illustrating an SDT procedure, according to an example implementation of the present disclosure. In some implementations, the illustrated SDT procedure may be performed by the UE 100.

The UE may be in an RRC_INACTIVE state when the illustrated SDT procedure is initiated. Additionally, the UE may be configured with SDT configurations (e.g., via an information element (IE), such as the IE sdt-Config and/or the IE sdt-ConfigCommon). The SDT configurations may be configured via an RRC release message (and/or via a suspend configuration message), and/or via system information (e.g., SIB). The configuration(s) for SDT may include a RACH configuration (e.g., configured via the IE ra-SDT-config), a CG configuration (e.g., configured via the IE cg-SDT-config), configuration(s) for SRB/DRB used for SDT, DRB list (e.g., configured via the IE sdt-DRBList), and/or an SRB indication (e.g., configured via the IE SRB2Indication).

In action 102, UL data may be arrived at the UE for transmission. The received UL data may be associated with a specific DRB/SRB/LCH. The specific DRB/SRB/LCH may be configured for SDT. The specific DRB/SRB/LCH may be configured by a DRB list (e.g., via the IE sdt-DRBList) and/or an SRB indication (e.g., via the IE SRB2Indication). Then the UE may initiate (or resume) a procedure for SDT (e.g., an SDT procedure).

The UE (e.g., a MAC entity of the UE) may be configured (e.g., via RRC signaling or through a SIB) with the SDT configuration, and an SDT procedure may be initiated (e.g., by the RRC layer and/or the MAC layer) by the UE. The SDT may be performed either via an RA procedure with the 2-step RA type or the 4-step RA type (e.g., RA-SDT) or via a configured grant type 1 (e.g., CG-SDT). For the SDT procedure, the UE (e.g., the MAC entity of the UE) may consider the radio bearers configured with SDT which are suspended for data volume calculation.

In action 104, the UE may determine whether to start an SDT procedure 106 (e.g., initiate the SDT procedure, initiate an RA procedure for SDT, and/or initiate an SDT procedure with CG), or initiate a non-SDT procedure (e.g., an RRC connection resume procedure) 116, (e.g., by initiating an RA procedure for a CCCH logical channel). The UE may determine whether to initiate an SDT procedure 106 or initiate a non-SDT procedure 116 based on one or more criteria (e.g., DRB/SRB, data volume, and/or RSRP).

In some implementations, the UE may initiate the SDT procedure when/after at least one LCH/DRB/SRB is configured for SDT, and the at least one LCH/DRB/SRB has pending data. For example, the data may be available for transmission for LCHs/DRBs/SRBs for which the SDT is enabled. The LCH/DRB/SRB configured for SDT may be resumed/re-established when the UE initiates the SDT procedure. The UE may initiate the RRC connection resume procedure when/after at least one LCH/DRB/SRB is not configured for SDT, and the at least one LCH/DRB/SRB has pending data. In some implementations, the UE may initiate the SDT procedure if data volume for transmission (e.g., for SDT) is lower than a (configured) threshold for SDT. The data volume may count the (total) volume of the LCHs/DRBs/SRBs configured for SDT. The UE may initiate an RRC connection resume procedure if the data volume for transmission (e.g., for SDT) is higher than a (configured) threshold for SDT. In some implementations, the UE may initiate the SDT procedure if an RSRP is larger than a configured RSRP threshold for SDT. The UE may initiate an RRC connection resume procedure if an RSRP is lower than a configured RSRP threshold for SDT.

In action 106, there may be two types of the SDT procedure. One type may be based on the RA procedure (e.g., 2-step RA or 4-step RA). The SDT based on the RA procedure may be referred to as the RA-based SDT 112 (or may also be referred to as the RA-SDT). The other type may be based on the CG (e.g., type 1 CG). The SDT based on the CG may also be referred to as the CG-based SDT 114 (or may also be referred to as the CG-SDT). The UE may transmit the UL data (e.g., small data), via an Msg3, an MsgA, a CG resource, and/or one or more PUSCH resources, during the SDT procedure.

In action 108, the UE may perform UL carrier selection (e.g., if SUL is configured in the cell, the UL carrier may be selected based on the RSRP threshold). After the UL carrier selection, the UE may perform the SDT procedure on the selected UL carrier (e.g., either UL or SUL).

Table 1 below shows an example of an SDT procedure.

TABLE 1

The UE/MAC entity may:
1> if the data volume of the pending UL data accorss all logical channels configured for Small Data Transmission is less or equal than sdt-DataVolumeThreshold:
    2> if the Serving Cell for Small Data Transmission is configured with supplementary uplink as specified in the 3GPP TS 38.331; and
    2> if the RSRP of the downlink pathloss reference is less than sdt-RSRP-ThresholdSSB-SUL:
        3> select the SUL carrier.
    2> else:
        3> select the NUL carrier.
    2> if the RSRP of the downlink pathloss reference is higher than sdt-RSRP-Threshold, if configured:
        3> if configured grant type 1 is configured for Small Data Transmission, and the configured grant type 1 resource is valid:
            4> initiate Small Data Transmission with configured grant type 1 on the selected UL carrier;
            4> indicate to the upper layer that conditions for initiating Small Data Transmission are fulfilled.
        3> else if Random Access Resources are configured for Small Data Transmission:
            4> initiate Random Access procedure on the selected UL carrier for Small Data Transmission;
            4> indicate to the upper layer that conditions for initiating Small Data Transmission are fulfilled.
        3> else:
            4> initiate Random Access procedure for CCCH logical channel (e.g., not for Small Data Transmission);
    2> else:
        3>initiate Random Access procedure for CCCH logical channel (e.g., not for Small Data Transmission);
1> else:
    2> initiate Random Access procedure for CCCH logical channel (e.g., not for Small Data Transmission);

In action 110, the UE may determine whether a CG resource/configuration is valid (during the SDT procedure) based on one or more of the following criteria.

The UE may determine whether a CG resource/configuration is valid based on whether an associated beam is valid. Determining whether the associated beam is valid or not may be based on an RSRP threshold. The RSRP threshold may be configured in the RRC release message and/or the CG configuration. If there is at least one beam with RSRP above the RSRP threshold, the UE may determine that the CG resource/configuration is valid. If there is no beam with RSRP above the RSRP threshold, the UE may determine that the CG resource/configuration is not valid.

The UE may also determine whether a CG resource/configuration is valid based on whether the TA is valid. For example, the UE may determine that the CG resource/configuration is valid during the time that the TA is valid. If the TA is not valid (e.g., expired), the UE may determine that the CG resource/configuration is not valid. Whether a TA is valid may be based on a TA timer. For example, the UE may determine that the TA is valid while the TA timer is running. The UE may determine that the TA is not valid when the TA timer is not running. The (parameter of) TA timer may be configured in the RRC release message and/or the CG configuration. Whether a TA is valid may also be based on an RSRP change volume. For example, the UE may determine that the TA is not valid if the RSRP change volume is higher than a threshold. The threshold (for RSRP change volume) may be configured in the RRC release message and/or the CG configuration.

Table 2 below shows an example of validation for SDT using CG.

TABLE 2

The UE may consider the time alignment value for Small Data Transmission using configured grant type 1 to be valid when the following conditions are fulfilled:
1> compared to the stored downlink pathloss reference RSRP value, the RSRP has not increased by more than cg-SDT-RSRP-ChangeThresholdIncrease, if configured; and
1> compared to the stored downlink pathloss reference RSRP value, the RSRP has not decrease by more than cg-SDT-RSRP-ChangeThresholdDecrease, if configured The UE may determine whether a CG resource is valid based on whether the CG configuration is valid. In some implementations, when the CG resource configuration is (re)initialized, the CG resource configuration may be determined as being valid, otherwise the CG resource configuration may be determined as being invalid. The CG resource configuration may be configured in the RRC release message.

The UE may also determine whether a CG resource/configuration is valid based on whether a timer (e.g., an SDT failure detection timer) is running or not. In some implementations, the timer may be configured in the RRC release message and/or the CG configuration. The UE may determine that the CG resource/configuration is valid while the timer is running, otherwise the CG resource/configuration is not valid. Such a timer may be used, in some implementations, to detect the failure of the SDT. The timer may be (re)started upon transmission of UL data when the UE is in the RRC_INACTIVE state. The timer may also be (re)started upon transmission of small data, or upon transmission of an RRC resume request. Additionally, the timer may be stopped upon reception of an RRCResume, RRCSetup, RRCRelease, or an RRCRelease with suspendConfig, or an RRCReject message. The timer may also be stopped during a cell re-selection or upon abortion of a connection establishment by the upper layers. When the timer expires, the UE may transition to the RRC_IDLE state (e.g., with a specific RRC resume cause).

Returning to FIG. 1, if the UE determines, in action 110, that the CG resource/configuration is not valid (e.g., one of the criteria for CG validity is not satisfied), the UE may perform, in action 112, an RA-based SDT procedure. For example, the UE may initiate an RA procedure (e.g., for SDT). The RA procedure may be either a 2-step or a 4-step type based on what the UE selects (e.g., according to an RSRP threshold). The UE may perform the transmission of the RA preamble (e.g., via the preamble/RA resource/PRACH resource which is configured for the SDT). The UE may perform the UL transmission (e.g., small data) via an Msg3/MsgA.

On the other hand, if the UE determines, in action 110, that the CG is valid (e.g., one or more criteria for the CG validity are satisfied), the UE may perform, in action 114, a CG-based SDT procedure. For example, the UE may perform the UL transmission (e.g., for small data) via a CG resource.

Additionally, if the criteria (e.g., DRB/SRB, data volume, and/or RSRP), in action 104, for initiating the SDT procedure is not satisfied, the UE may initiate, in action 116, a non-SDT procedure (e.g., RRC connection resume procedure). For example, the UE may initiate an RA procedure for a CCCH logical channel.

In action 118, the SDT procedure may be terminated/stopped/completed, for example, after receiving an indication from the NW (e.g., via RRC release message), or via a timer (e.g., an SDT failure detection timer expires), and/or by a counter (e.g., the value of the counter reaches a maximum value).

In some implementations, the SDT procedure may fallback/switch to the non-SDT procedure (e.g., an RRC connection resume procedure). For example, when the UE receives an indication (e.g., a fallback indication via an RRC resume/RRC release message) from the NW, the UE may stop/terminate/complete the SDT procedure and then may initiate an RRC connection resume procedure. If the initial UL transmission (e.g., in MsgA/Msg3/CG resources) fails a (configured) number of times, the UE may stop/terminate/complete the SDT procedure and then may initiate an RRC connection resume procedure. While an RA procedure of an RA-based SDT is ongoing and the condition to fallback/switch to the non-SDT procedure (e.g., RRC connection resume procedure) is satisfied, the UE may switch the RA type of the RA procedure from a 4-stepRA-SDT/2-stepRA-SDT type to a 4-stepRA/2-stepRA type.

Figure 2:
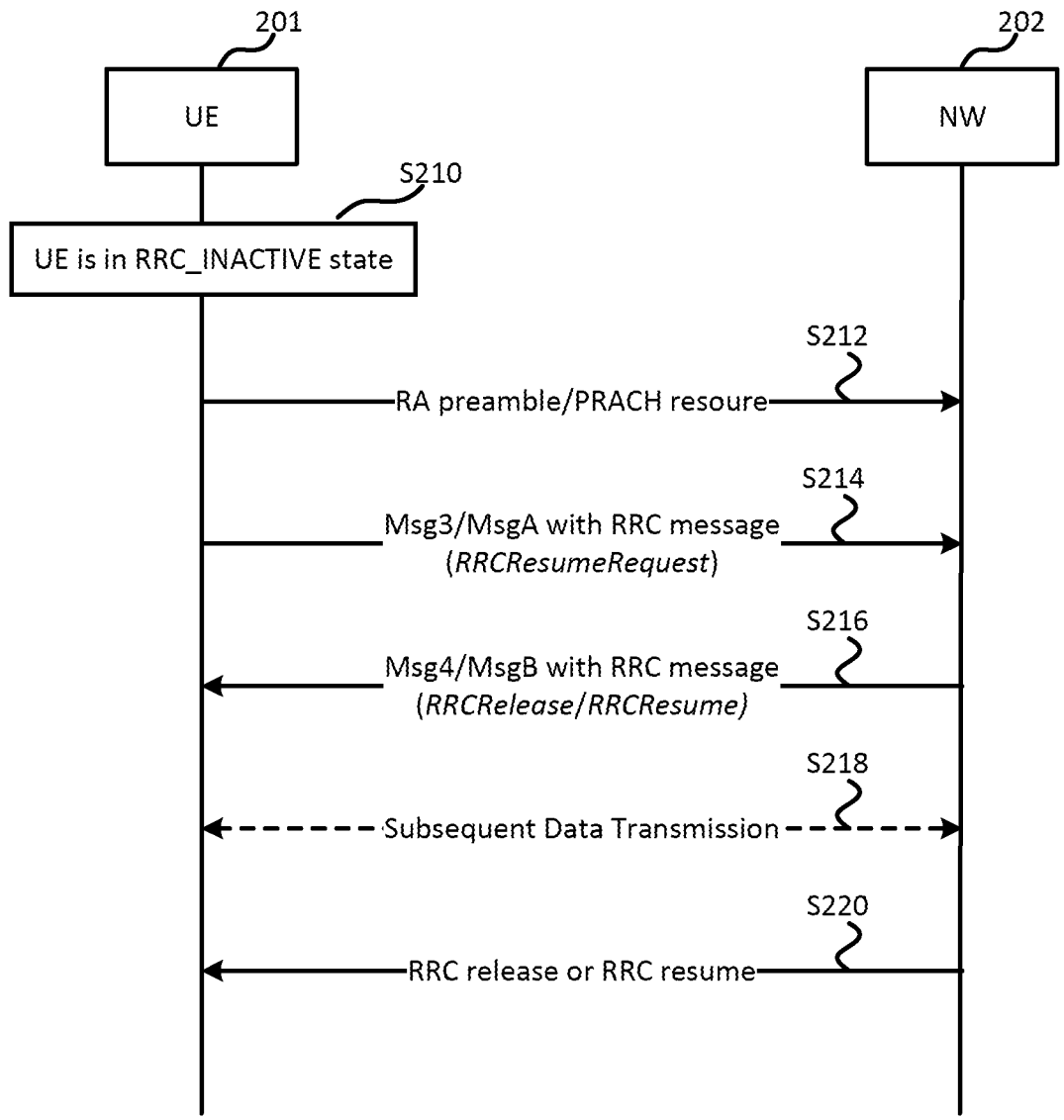
FIG. 2 is a diagram illustrating a Random Access (RA)-based SDT procedure, according to an example implementation of the present disclosure.

FIG. 2 is a diagram illustrating an RA-based SDT procedure, according to an example implementation of the present disclosure.

FIG. 2, as shown illustrate communications between the UE 201 and the NW 202. In action S210, the UE 201 may be in an RRC_INACTIVE state.

Next, in action S212, when the UE 201, in the RRC_INACTIVE state, has UL data available for transmission and/or an SDT procedure has been initiated, the UE 201 may initiate an RA-based SDT procedure for the transmission of the UL data (e.g., in a case that the CG is considered as not valid). The UE 201 may select either the 4-step RA type or the 2-step RA type. The preamble/PRACH resource for the RA-based SDT procedure (e.g., RA preamble/PRACH resource configured for SDT) and the normal RA procedure (e.g., RA preamble not configured for SDT) may be different. Here, the UE 201 may select the preamble/PRACH resource configured for SDT.

In action S214, after transmitting the RA preamble, the UE 201 may transmit an RRC message (e.g., a CCCH message), MAC CE(s), and/or UL data through an Msg3 (e.g., when the 4-step RA type is selected) or an MsgA (e.g., when the 2-step RA type is selected). The RRC message may be an RRCResumeRequest message. In addition to the RRC message, MAC CE (e.g., BSR), and UL data (e.g., data associated with DRB(s) for SDT) may be included in the Msg3/MsgA as well.

In action S216, once the Msg3/MsgA is transmitted, the UE 201 may monitor Temporary C-RNTI/C-RNTI/RA-RNTI/MSGB-RNTI for Msg4/MsgB, in which the contention resolution ID may be carried. In addition, the NW 202 may transmit an RRC message in an Msg4/MsgB. The RRC message may be an RRC Release message (e.g., with suspendConfig IE) or an RRC Resume message. The UE 201 may stay in the RRC_INACTIVE state if the UE 201 receives an RRC Release message (e.g., with suspendConfig IE) or transitions to the RRC_CONNECTED state, for example, if the UE 201 receives an RRC Resume message.

In action S218, once the RA procedure for SDT is successfully completed, the UE 201 may monitor a specific RNTI (e.g., C-RNTI) on a specific search space for subsequent data transmission. The subsequent data transmission may be the transmission of multiple UL and/or DL data packets as part of the SDT procedure without transitioning to the RRC_CONNECTED state (e.g., while the UE 201 may still be in the RRC_INACTIVE state). The UE 201 may monitor a PDCCH via a specific RNTI (e.g., C-RNTI) to receive the dynamic scheduling for the UL and/or DL new transmissions and/or the retransmissions of the UL and/or DL new transmissions. The UE 201 may monitor a PDCCH via a UE specific RNTI (e.g., C-RNTI) to receive the dynamic scheduling for the retransmission of the UL data via a CG resource.

In action S220, the NW 202 may send an RRC release message (e.g., with suspendconfig) to keep the UE 201 in the RRC_INACTIVE state, or to move the UE to the RRC_IDLE state. The NW 202 may send an RRC resume message to move the UE 201 to the RRC_CONNECTED state. Once the RRC Release message (e.g., with suspendConfig IE) is received, the UE 201 may terminate the SDT procedure based on the RRC Release message, and/or may stop monitoring the C-RNTI, and/or may stay in the RRC_INACTIVE state.

Figure 3:
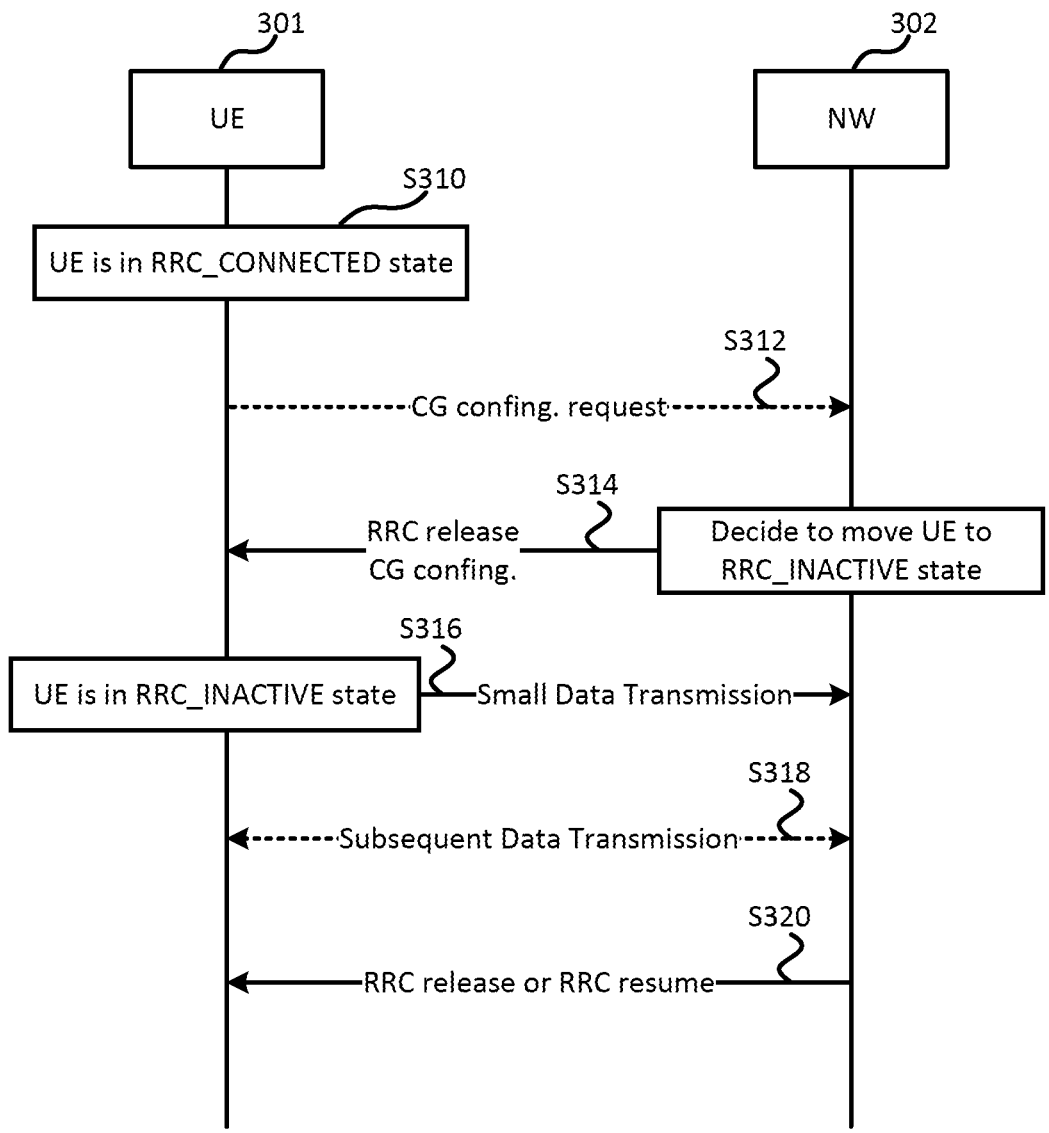
FIG. 3 is a diagram illustrating a Configured Grant (CG)-based SDT procedure, according to an example implementation of the present disclosure.

FIG. 3 is a diagram illustrating a CG-based SDT procedure, according to an example implementation of the present disclosure.

FIG. 3, as shown illustrate communications between the UE 301 and the NW 302. In action S310, the UE 301 may be in an RRC_CONNECTED state.

Next, in action S312, when the UE 301 is in the RRC_CONNECTED state, the UE 301 may send a CG configuration request to the NW 302 to indicate its preference on CG configuration for small data and/or for the RRC_INACTIVE state.

In action S314, the NW 302 may decide to move the UE 301 to the RRC_INACTIVE state by sending an RRC Release message (e.g., including suspendconfig IE) to the UE 301. The RRC release message may include at least one CG configuration to configure the CG resources to the UE 301. The CG configuration may include, but is not limited to, a CG periodicity, a TBS, a number for the implicit release of the CG resources, a CG Timer, a retransmission timer, a number of HARQ processes reserved for the CG in SDT, an RSRP threshold for SSB selection and association between the SSB and CG resources, and TA related parameters (e.g., cg-SDT-TimeAlignmentTimer).

In action S316, the UE 301 may perform the SDT procedure based on the CG resources (e.g., in the RRC_INACTIVE state) according to the CG configuration (e.g., configured in S314). For example, the UE 301 may transmit UL data (e.g., small data) via the CG resource (e.g., during the SDT procedure).

In action S318, subsequent data transmission may be a transmission of multiple UL and/or DL packets, as part of the SDT procedure without transitioning to the RRC_CONNECTED state (e.g., the UE 301 may still be in the RRC_INACTIVE state). The UE 301 may monitor a PDCCH via a specific RNTI (e.g., C-RNTI, CS-r, and/or an SDT RNTI) on a search space (e.g., configured by a CG configuration) to receive dynamic scheduling for new UL and/or DL transmissions and/or the retransmissions of the new UL and/or DL transmissions. The UE 301 may monitor a PDCCH via the specific RNTI to receive the dynamic scheduling for the retransmission of the CG. The UE 301 may also perform a subsequent data transmission via a CG resource according to the CG configuration (e.g., configured in S314).

In action S320, the NW 302 may send an RRC release (with suspendconfig) message to keep the UE 301 in the RRC_INACTIVE state or to move the UE 301 to the RRC_IDLE state. The NW 302 may send an RRC resume message to move the UE 301 to the RRC_CONNECTED state. Once the RRC Release message (e.g., with suspendConfig IE) is received, the UE 301 may terminate the SDT procedure based on the RRC Release message, and/or may stop monitoring the specific RNTI, and/or may stay in the RRC_INACTIVE state.

Figure 4:
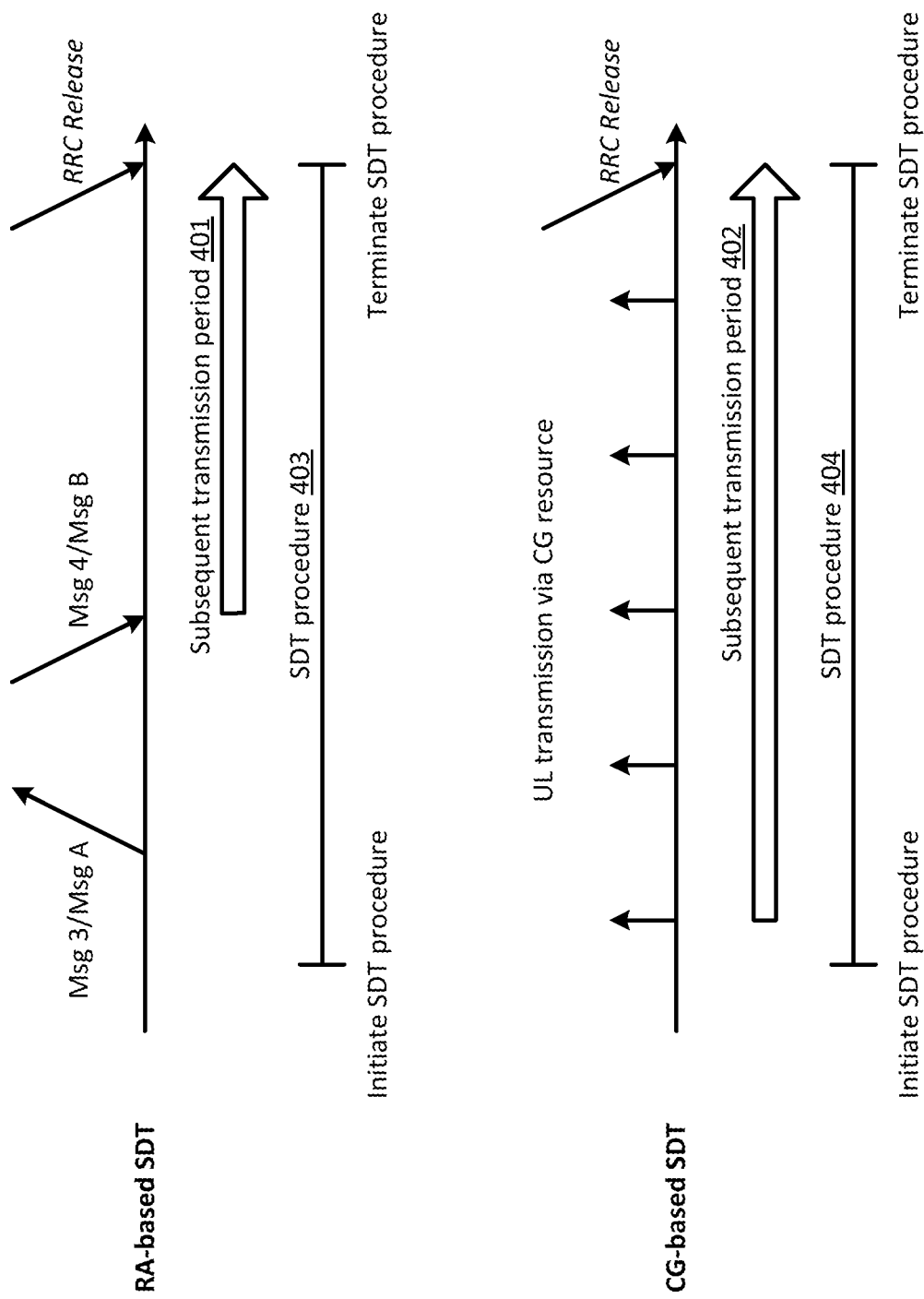
FIG. 4 is a schematic diagram illustrating a subsequent transmission period (or subsequent transmission phase) of a SDT procedure, according to an example implementation of the present disclosure.

FIG. 4 is a schematic diagram illustrating a subsequent transmission period (or subsequent transmission phase) of an SDT procedure, according to an example implementation of the present disclosure.

The subsequent transmission period 401 may be determined as a time period during an RA-based SDT procedure 403. The subsequent transmission period 402 may be determined as a time period during a CG-based SDT procedure 404. For example, the subsequent transmission periods 401, 402 may be time periods during which the SDT procedures 403, 404, respectively, are ongoing. For example, the subsequent transmission period 402 may be a time period while a CG configuration is configured, or after the CG configuration is initiated (e.g., and the CG configuration is not released).

In some implementations, the subsequent transmission period 401 may be determined as started when/after the UE initiates the SDT procedure 403. The subsequent transmission period 402 may be determined as started when/after the UE initiates the SDT procedure 404.

In some implementations, the subsequent transmission period 401 may be determined as started when/after the UE considers a contention resolution is successful for an RA procedure and/or after the UE considers the RA procedure as being successfully completed. The RA procedure may be an RA-based SDT. The RA procedure may be initiated for the SDT.

In some implementations, the subsequent transmission period 402 may be determined as started when/after the CG configuration is configured/(re)initialized. The CG configuration may include a parameter which may be used to indicate the SDT scheduling.

In some implementations, the subsequent transmission period 402 may be determined as started when/after the CG configuration is considered as valid.

In some implementations, the subsequent transmission periods 401, 402 may be determined as started when/after the UE transmits a UL message. The UL message may be transmitted via an Msg1/Msg3/MsgA/CG resource/UL resource scheduled by Msg2/MsgB/Msg4 (e.g., during the SDT procedures 403, 404) or on an UL resource that is (pre)configured as part of the SDT configuration. The UL message may include an RRC resume request message (e.g., RRCResumeRequest, RRCResumeRequest1, and/or a CCCH message for SDT). The UL message may include small data (e.g., UL data associated with a specific SRB/DRB/LCH for SDT). The UL message may include a MAC CE (e.g., a BSR MAC CE).

In some implementations, the subsequent transmission periods 401, 402 may be determined as started when/after the UE receives a response from the NW. The response may be an Msg2/Msg4/MsgB and/or a response for a UL transmission via a CG resource. The response may be used for contention resolution (e.g., for an RA procedure). The response may include an (HARQ/RRC) ACK/NACK message, and/or a DFI, for example, for (the first) UL transmission via the CG resource. The response may contain a UL grant/DL assignment for a new transmission/retransmission. The response may be a PDCCH addressed to an RNTI (e.g., a C-RNTI, a CS-RNTI, a dedicated RNTI, an RNTI for SDT, and/or an RNTI for CG). The response may indicate a UL grant for a new transmission for the HARQ process used for the transmission of an UL transmission for small data (e.g., a UL message). The response may include a specific command (e.g., a TA command MAC CE). The response may include an RRCResume, RRCSetup, RRCRelease, RRCRelease with SuspendConfig, RRCReestablishment, RRCReconfiguration, and/or an RRCReject.

In some implementations, the subsequent transmission period 401 (and/or the SDT procedure 403) may be terminated/stopped when/after the SDT procedure 403 is terminated. The subsequent transmission period 402 (and/or the SDT procedure 404) may be terminated/stopped when/after the SDT procedure 404 is terminated.

In some implementations, the subsequent transmission period 402 (and/or the SDT procedure 404) may be terminated/stopped when/after the CG configuration is released/suspended/cleared.

In some implementations, the subsequent transmission period 402 (and/or the SDT procedure 404) may be terminated/stopped when/after the CG configuration is considered as invalid.

In some implementations, the subsequent transmission periods 401, 402 (and/or the SDT procedures 403, 404) may be terminated/stopped when/after the UE receives an indication from the NW. The indication may include an RRCResume, an RRCSetup, an RRCRelease, an RRCRelease with SuspendConfig, RRCReestablishment, and/or an RRCReject. The indication may be a PDCCH addressed to an RNTI (e.g., a C-RNTI, a CS-RNTI, a dedicated RNTI, an RNTI for SDT, and/or an RNTI for CG). The indication may indicate to the UE to terminate the SDT procedures 403, 404 and/or the subsequent transmission periods 401, 402 (e.g., via a field included in the indication). The indication may indicate to the UE to initiate an RRC procedure (e.g., an RRC connection resume procedure, an RRC establishment procedure, and/or an RRC reestablishment procedure). The indication may indicate to the UE to switch/fallback the types for SDT (e.g., the types may be an RA-based SDT, a CG-based SDT, a 2-step RA, or a 4-step RA). The indication (with a specific value, e.g., TRUE or FALSE) may be included in system information (e.g., a SIB) to indicate that the CG transmission in the RRC_INACTIVE state is no longer supported in the cell. For example, when the UE receives the indication (with a specific value, e.g., TRUE or FALSE), the UE may release/suspend the CG configuration(s).

In some implementations, the subsequent transmission periods 401, 402 (and/or the SDT procedures 403, 404) may be terminated/stopped when/after a timer expires. The timer may be an SDT failure/problem detection timer. The timer may be specifically configured for the SDT. The value of the timer may be configured via an RRC release message. The value of the timer may be configured via the RRC release message with suspend configuration. The value of the timer may be configured via a configuration for SDT. The value of the timer may be configured via a RACH configuration for SDT. The value of the timer may be configured via a CG configuration for SDT. The value of the timer may be configured via the IE UE-TimersAndConstants. The value of the timer may be configured via system information (e.g., a SIB). The timer may be a TA timer, ra-ResponseWindow, msgB-ResponseWindow, ra-ContentionResolutionTimer, configuredGrantTimer, cg-RetransmissionTimer, drx-onDurationTimer, drx-InactivityTimer, drx-RetransmissionTimerDL, drx-RetransmissionTimerUL, T300, T301, T302, T304, T310, T311, T312, T316, T319, T320, T321, T322, T325, T330, T331, T342, and/or T345. The timer may be used for monitoring a response (e.g., for ACK/NACK). The timer may be a response window. The timer may be used for receiving a PDCCH/scheduling (e.g., for new transmission or retransmission) from the NW.

In some implementations, the subsequent transmission periods 401, 402 may be terminated/stopped when/after the UE enters an RRC_IDLE state or an RRC_CONNECTED state (e.g., from the RRC_INACTIVE state). In some implementations, the subsequent transmission periods 401, 402 may be terminated/stopped/released when/after the UE performs a cell selection/reselection. In some implementations, the subsequent transmission periods 401, 402 may be terminated/stopped upon the abortion of a connection establishment, for example, by the upper layers. In some implementations, the subsequent transmission periods 401, 402 may be terminated/stopped upon a RAN notification area (RNA) update. In some implementations, the subsequent transmission periods 401, 402 may be terminated/stopped when/after the UE establishes/resumes an RRC connection from the RRC_INACTIVE state on a cell different from the cell where the CG configuration was provided. In some implementations, the subsequent transmission periods 401, 402 may be terminated/stopped when/after the UE initiates an RRC re-establishment procedure. For example, the subsequent transmission periods 401, 402 may be terminated/stopped after the UE sends an RRCReestablishmentRequest to the network. In some implementations, the subsequent transmission periods 401, 402 may be terminated/stopped when/after the UE is indicated, by the network, to perform a carrier switching (e.g., from NUL to SUL or vice versa). In some implementations, the subsequent transmission periods 401, 402 may be terminated/stopped when/after the UE is indicated, by the network, to perform a (UL/DL) BWP switching.

In the subsequent transmission periods 401, 402, the UE may need to monitor the PDCCH (e.g., to receive the possible (DL and/or UL) scheduling from the NW). The UE may monitor the PDCCH (e.g., during the SDT procedures 403, 404 and/or during the subsequent transmission periods 401, 402) based on a search space, a CORESET, and/or an RNTI. For example, the UE may monitor the PDCCH addressed to the C-RNTI after a successful completion of the RA procedure for SDT.

The Search Space (SS) may be at least one of the following (a) and (b).

(a): Common Search Space (CSS): In some implementations, the CSS may be the common search space(s) configured in the PDCCH-ConfigCommon, the type-1 PDCCH CSS set configured by ra-SearchSpace, the type-3 PDCCH CSS set, the search space zero, a new CSS set configured via system information (e.g., a SIB) or an RRC release message, and/or a search space with parameters of the search space(s) configured in the initial BWP.

(b): UE-specific Search Space (USS): In some implementations, the USS set may be a USS set configured via an RRC Release message, a USS configured via an Msg4/MsgB, a USS set configured via a PDCCH-Config, a USS set configured via a configuration(s) for SDT, a search space with an ID other than 0-39, and/or a search space set identified as specific set for SDT.

The CORESET may be at least one of the following (a) and (b).

(a): common CORESET: In some implementations, the common CORESET may be CORESET 0, or a CORESET other than CORESET 0.

(b): UE-specific CORESET configuration: In some implementations, the UE-specific CORESET configuration may be a UE-specific CORESET configured via an RRC Release message, a UE-specific CORESET configured via an Msg4/MsgB, a UE-specific CORESET configured via a configuration(s) for SDT, a CORESET with an ID other than 0-14.

The RNTI may include a C-RNTI, a CS-RNTI, an SDT-RNTI, an RNTI for SDT, an RNTI for CG.

The UE may initiate/perform an SDT procedure if one or more criteria for initiating the SDT procedure are satisfied (e.g., when the LIE is in the RRC_INACTIVE state). The SDT procedure may be initiated by an RA procedure (e.g., an RA-SDT procedure) and/or may be initiated by a CG transmission (e.g., a CG-SDT procedure). During the SDT procedure, the UE may need to transmit the HARQ feedback (e.g., HARQ-ACK and/or HARQ-NACK) on the PUCCH for some DL signals. For example, in an RA-SDT, the UE may need to transmit the HARQ feedback for the Msg4/MsgB (e.g., a PDSCH reception with the UE contention resolution identity), and/or DL transmissions on the PDSCH (e.g., scheduled in the subsequent phase of the SDT procedure). In a CG-SDT, the UE may need to transmit the HARQ feedback for the DL transmissions on the PDSCH (e.g., scheduled in the subsequent phase of the SDT procedure). Some of the present implementations provide a mechanism to configure the UE (or to indicate to the UE) on which PUCCH resource the HARQ feedback may be transmitted and how the UE may be able to apply/release the PUCCH configuration/resource in an SDT procedure. Some of the present implementations provide solutions on PUCCH-related issues. The UE may transmit the HARQ feedback in a PUCCH in some implementations, and the PUCCH transmission and the PUSCH transmission may be within the same active UL BWP.

PUCCH Configuration

In some implementations, the PUCCH configuration may be configured by a common PUCCH configuration (e.g., pucch-ConfigCommon). The common PUCCH configuration may be configured by a BWP-UplinkCommon, an UplinkConfigCommon, a ServingCellConfigCommon, and/or system information (e.g., via SIB1). The common PUCCH configuration may be configured on an initial BWP. The initial BWP may be referred to as BWP #0. The initial BWP may be configured by an initialUplinkBWP and/or an initialDownlinkBWP. The common PUCCH configuration may indicate the PUCCH resources/parameters (e.g., by pucch-ResourceCommon). The PUCCH resources may be indicated by an entry of a (16-row) table where each row configures a set of cell-specific PUCCH resources/parameters (e.g., including PUCCH format, first symbol, number of symbols, PRB offset, set of initial CS indexes, etc.). The UE may use those PUCCH resources until the UE is provided with a dedicated PUCCH-Config (e.g., during an initial access) on the initial uplink BWP. Once the network provides a dedicated PUCCH-Config for the bandwidth part, the UE may determine the PUCCH resources based on the dedicated PUCCH-Config instead of the common PUCCH configuration (e.g., pucch-ResourceCommon). If a UE does not have dedicated PUCCH resource configuration (e.g., provided by PUCCH-ResourceSet in PUCCH-Config), a PUCCH resource set may be provided by pucch-ResourceCommon through an index to a row of the (16-row) table.

In some implementations, the PUCCH configuration may be configured by a dedicated PUCCH configuration (e.g., pucch-Config). The dedicated PUCCH configuration may be configured by a BWP-UplinkDedicated, UplinkConfig, ServingCellConfig. The dedicated PUCCH configuration may be configured while the UE is in the RRC_CONNECTED state. The UE may store the dedicated PUCCH configuration when the UE enters the RRC_INACTIVE state. The UE may apply the stored dedicated PUCCH configuration when the UE initiates an SDT procedure. The dedicated PUCCH configuration may be configured on a dedicated BWP. The dedicated BWP may be a specific BWP configured for SDT. The information (e.g., index) of the dedicated BWP may be indicated by an SDT configuration and/or an RA configuration of the SDT and/or a CG configuration of the SDT. The dedicated BWP may be indicated by a bwp-ID. The dedicated PUCCH configuration may be configured for one BWP of the normal UL or an SUL of a serving cell. If the UE is configured with SUL, the network may configure dedicated PUCCH only on the BWPs of one of the uplinks (a normal UL or an SUL). The network may configure PUCCH-Config at least on non-initial BWP(s) for SpCell and the PUCCH SCell. The network may configure at most one additional SCell of a cell group with the PUCCH-Config (e.g., PUCCH SCell). The NW may configure dedicated PUCCH for a BWP when setting up the BWP.

In some implementations, the PUCCH configuration may be configured by an SDT-specific common PUCCH configuration (e.g., pucch-configCommon and/or sdt-pucch-ConfigCommon). The SDT-specific common PUCCH configuration may be configured by a BWP-UplinkCommon, an UplinkConfigCommon, a ServingCellConfigCommon, and/or system information (e.g., via SIB1). The SDT-specific common PUCCH configuration may be configured by the BWP-UplinkDedicated, UplinkConfig, and/or the ServingCellConfig. The SDT-specific common PUCCH configuration may be configured by one or more of the following configurations (a)-(f).

(a) System information (e.g., SIB1 or in other SIs in the NR protocols).

(b) RRC release configuration (e.g., an RRC Release message) and/or a suspend configuration (e.g., SuspendConfig).

(c) SDT configuration: The SDT configuration may include common SDT configuration (e.g., sdt-ConfigCommon) and dedicated SDT configuration (e.g., sdt-Config).

(d) RA configuration: The RA configuration(s) may include RACH-ConfigCommon, RACH-ConfigGeneric, RACH-ConfigDedicated, RACH-ConfigCommonTwoStepRA, and/or RACH-ConfigGenericTwoStepRA. The RA configuration may include common RA configuration for SDT (e.g., RACH-ConfigCommonSDT and/or dedicated RA configuration for SDT (e.g., RACH-ConfigSDT).

(e) CG configuration: The CG configuration may include common CG configuration for SDT (e.g., cg-SDT-Config-Common). The CG configuration may include dedicated CG configuration for SDT (e.g., cg-SDT-Config).

(f) BWP configuration: The BWP configuration may include common BWP configuration (e.g., BWP-Uplink-Common). The BWP configuration may include dedicated BWP configuration (e.g., BWP-UplinkDedicated). The BWP configuration may include dedicated BWP configuration for SDT (e.g., sdt-BWP-UplinkDedicated).

The SDT-specific common PUCCH configuration may be configured on an initial BWP and/or a dedicated BWP (e.g., a dedicated BWP configured with a CG-SDT/RA-SDT configuration/resource). The initial BWP may be referred to as BWP #0. The initial BWP may be configured by an initialUplinkBWP and/or an initialDownlinkBWP. The dedicated BWP may be a specific BWP configured for SDT. The information (e.g., index) of the dedicated BWP may be indicated by an SDT configuration and/or an RA configuration of the SDT and/or a CG configuration of the SDT. The dedicated BWP may be indicated by a bwp-ID.

The SDT-specific common PUCCH configuration may indicate the SDT-specific common PUCCH resources/parameters (e.g., by sdt-pucch-ResourceCommon). The SDT-specific common PUCCH resources may be indicated by an entry of a (16-row) table where each row configures a set of cell-specific and/or sdt-specific PUCCH resources/parameters (e.g., including PUCCH format, first symbol, number of symbols, PRB offset, set of initial CS indexes). The UE may use SDT-specific common PUCCH resources until the UE is provided with a dedicated PUCCH-Config (e.g., sdt-pucch-Config) on a BWP (e.g., initial uplink BWP). Once the network provides a dedicated PUCCH-Config for a BWP, the UE may apply the dedicated PUCCH-Config instead of the SDT-specific common PUCCH resources. If a UE does not have dedicated PUCCH resource configuration (e.g., provided by PUCCH-ResourceSet in PUCCH-Config), a PUCCH resource set may be provided by the sdt-pucch-ResourceCommon through an index to a row of the (16-row) table.

In some implementations, the SDT-specific dedicated PUCCH configuration may be configured by pucch-Config IE and/or sdt-pucch-Config IE. In some implementations, the NW may need to configure a (SDT-specific) dedicated PUCCH configuration on a dedicated BWP if the NW configures the dedicated BWP for the RA-SDT and/or the Cg-SDT. The field of the (SDT-specific) dedicated PUCCH configuration may be mandatorily presented for the dedicated BWP.

The SDT-specific dedicated PUCCH configuration may be configured by the BWP-UplinkDedicated, UplinkConfig, ServingCellConfig. The SDT-specific dedicated PUCCH configuration may be configured by one or more of the following configurations (a)-(f).

(a) System information (e.g., SIB1 or in 'other SI' in the NR protocols).

(b) RRC release configuration (e.g., an RRC Release message) and/or a suspend configuration (e.g., SuspendConfig).

(c) SDT configuration: The SDT configuration may include common SDT configuration (e.g., sdt-ConfigCommon) and dedicated SDT configuration (e.g., sdt-Config).

(d) RA configuration: The RA configuration(s) may include RACH-ConfigCommon, RACH-ConfigGeneric, RACH-ConfigDedicated, RACH-ConfigCommonTwoStepRA, and/or RACH-ConfigGenericTwoStepRA. The RA configuration may include common RA configuration for SDT (e.g., RACH-ConfigCommonSDT). The RA configuration may include dedicated RA configuration for SDT (e.g., RACH-ConfigSDT).

(e) CG configuration: The CG configuration may include common CG configuration for SDT (e.g., cg-SDT-ConfigCommon) and dedicated CG configuration for SDT (e.g., cg-SDT-Config).

(f) BWP configuration: The BWP configuration may include common BWP configuration (e.g., BWP-UplinkCommon), dedicated BWP configuration (e.g., BWP-UplinkDedicated) and dedicated BWP configuration for SDT (e.g., sdt-BWP-UplinkDedicated).

The SDT-specific dedicated PUCCH configuration may be configured on an initial BWP and/or a dedicated BWP (e.g., a dedicated BWP configured with CG-SDT/RA-SDT configuration/resource). The initial BWP may be referred to as BWP #0. The initial BWP may be configured by an initialUplinkBWP and/or an initialDownlinkBWP. The dedicated BWP may be a specific BWP configured for SDT. The information (e.g., index) of the dedicated BWP may be indicated by an SDT configuration and/or an RA configuration of the SDT and/or a CG configuration of the SDT. The dedicated BWP may be indicated by a bwp-ID.

The SDT-specific dedicated PUCCH configuration may indicate the UE specific PUCCH configurations used for the HARQ-ACK feedback reporting for SDT. A PUCCH-ResourceSet for SDT, namely the sdt-PUCCH-ResourceSet, may be configured by the network. The sdt-PUCCH-ResourceSet may be included in a pucch-Config IE or an sdt-pucch-Config IE. The sdt-PUCCHResourceSet may correspond to a PUCCH-ResourceSetId. The PUCCH-ResourceSetId to which the sdt-PUCCHResourceSet corresponds may be 0, 1, and 2. The sdt-PUCCH-ResourceSet may include a resourceList. The resourceList may include one or more PUCCH-ResourceId. Each of the one or more PUCCH-ResourceId may correspond to a PUCCH-Resource for SDT (e.g., sdt-PUCCH-Resource as described below). Such a resourceList may also be referred to as an sdt-resourceList or a resourceList for SDT in the present disclosure.

If a UE is configured with a dedicated PUCCH configuration, the UE may be configured with one or more PUCCH resources. A PUCCH resource may include one or more of the following parameters (a)-(h).

(a) a PUCCH resource index provided by pucch-ResourceId.

(b) an index of the first PRB prior to frequency hopping or for no frequency hopping by startingPRB, if a UE is not provided with useInterlacePUCCH-PUSCH in BWP-UplinkDedicated.

(c) an index of the first PRB after frequency hopping by secondHopPRB, if a UE is not provided with useInterlacePUCCH-PUSCH in BWP-UplinkDedicated.

(d) an indication for intra-slot frequency hopping by intraSlotFrequencyHopping, if a UE is not provided with useInterlacePUCCH-PUSCH in BWP-UplinkDedicated.

(e) an index of a first interlace by interlace0, if a UE is provided with useInterlacePUCCH-PUSCH in BWP-UplinkDedicated.

(f) if provided, an index of a second interlace by interlace1, if a UE is provided with useInterlacePUCCH-PUSCH in BWP-UplinkDedicated.

(g) an index of an RB set by rb-SetIndex, if a UE is provided with useInterlacePUCCH-PUSCH in BWP-UplinkDedicated.

(h) a configuration for a PUCCH format provided by format.

Apply PUCCH Configuration

In some implementations, the UE may initiate/perform an RA-SDT procedure on an initial BWP and/or a dedicated BWP (e.g., based on an RA configuration) while the UE is in the RRC_INACTIVE state. For example, the UE may initiate an RA procedure for SDT and may transmit a CCCH message (e.g., an RRC resume request message) in the Msg3/MsgA of the RA procedure. The RA configuration may be configured for the initial BWP and/or the dedicated BWP. The initial BWP may be referred to as BWP #0. The initial BWP may be configured by an initialUplinkBWP and/or an initialDownlinkBWP. The dedicated BWP may be a specific BWP configured for SDT. The information (e.g., index) of the dedicated BWP may be indicated by an SDT configuration and/or an RA configuration of the SDT. The dedicated BWP may be indicated by a bwp-ID. The RA procedure may be an RA procedure with the 2-step RA type or the 4-step RA type. The RA procedure may be a contention-based RA procedure. The RA procedure may be initiated for SDT. The UE may perform the RA preamble transmission via the RA preamble/RA resource/PRACH resource which is configured for SDT. The UE may apply the RA configurations/IEs which are configured for SDT (e.g., via a RACH-ConfigSDT, or a RACH-ConfigCommonSDT).

In some implementations, the UE may initiate/perform a CG-SDT procedure on an initial BWP and/or a dedicated BWP (e.g., based on a CG configuration) while the UE is in the RRC_INACTIVE state. For example, the UE may transmit a CCCH message (e.g., an RRC resume request message) via the CG resource configured for SDT. The CG configuration may be configured for the initial BWP and/or the dedicated BWP. The initial BWP may be referred to as BWP #0. The initial BWP may be configured by an initialUplinkBWP and/or an initialDownlinkBWP. The dedicated BWP may be a specific BWP configured for SDT. The information (e.g., index) of the dedicated BWP may be indicated by an SDT configuration and/or a CG configuration of the SDT. The dedicated BWP may be indicated by a bwp-ID. The CG configuration may be configured for SDT (e.g., via cg-SDT-config and/or cg-SDT-ConfigCommon). The CG configuration may be configured by System information (e.g., SIB1 or in other SI in the NR protocols) and/or RRC release configuration (e.g., an RRC Release message) and/or a suspend configuration (e.g., a SuspendConfig).

In some implementations, if the UE initiates/performs an RA-SDT/CG-SDT procedure, the UE may determine to apply a (SDT-specific) dedicated PUCCH configuration and/or a (SDT-specific) common PUCCH configuration based on different criteria. If the UE initiates a CG-SDT procedure, the UE may determine to apply a (SDT-specific) dedicated PUCCH configuration (e.g., instead of a (SDT-specific) common PUCCH configuration). If the UE initiates an RA-SDT procedure, the UE may determine to apply a (SDT-specific) common PUCCH configuration (e.g., instead of a (SDT-specific) dedicated PUCCH configuration).

In some implementations, if the UE initiates/performs an RA-SDT/CG-SDT procedure, the UE may determine to transmit the HARQ feedback for an Msg4/MsgB/DL transmission according to a (SDT-specific) dedicated PUCCH configuration and/or a (SDT-specific) common PUCCH configuration based on different criteria. If the UE initiates a CG-SDT procedure, the UE may determine to transmit the HARQ feedback for the DL transmission based on a (SDT-specific) dedicated PUCCH configuration (e.g., instead of a (SDT-specific) common PUCCH configuration). If the UE initiates an RA-SDT procedure, the UE may determine to transmit the HARQ feedback for Msg4/MsgB/DL transmission based on a (SDT-specific) common PUCCH configuration (e.g., instead of a (SDT-specific) dedicated PUCCH configuration).

In some implementations, the UE may be configured with a common PUCCH configuration and/or an SDT-specific common PUCCH configuration on the initial BWP. In some implementations, if the UE initiates/performs an RA-SDT/CG-SDT procedure on the initial BWP, the UE may determine whether to apply the common PUCCH configuration and/or the SDT-specific common PUCCH configuration based on one or more of the following criteria (a)-(g).

(a) If the UE initiates/performs an RA-SDT/CG-SDT procedure on the initial BWP, the UE may determine to apply both the common PUCCH configuration and the SDT-specific common PUCCH configuration.

If the UE is configured with the common PUCCH configuration and the SDT-specific common PUCCH configuration, the UE may use the PUCCH resources configured in the SDT-specific common PUCCH configuration (e.g., and not use the PUCCH resources configured in the common PUCCH configuration) even if the UE applies both the common PUCCH configuration and the SDT-specific common PUCCH configuration.

If the UE is configured with the common PUCCH configuration and the SDT-specific common PUCCH configuration, the SDT-specific common PUCCH configuration may configure the delta/updated parameters for the common PUCCH configuration. If the UE applies both the common PUCCH configuration and the SDT-specific common PUCCH configuration, the UE may apply the delta/updated parameters configured by the SDT-specific common PUCCH configuration to replace the parameters configured in the common PUCCH configuration.

(b) If the UE initiates/performs an RA-SDT/CG-SDT procedure on the initial BWP, the UE may determine whether to apply the common PUCCH configuration and/or the SDT-specific common PUCCH configuration based on whether the UE is configured with the SDT-specific common PUCCH configuration.

If the UE is configured with the SDT-specific common PUCCH configuration, the UE may apply the SDT-specific common PUCCH configuration (e.g., instead of the common PUCCH configuration).

If the UE is not configured with the SDT-specific common PUCCH configuration, the UE may apply the common PUCCH configuration (e.g., instead of the SDT-specific common PUCCH configuration).

(c) If the UE initiates/performs an RA-SDT/CG-SDT procedure on the initial BWP, the UE may determine whether to apply the common PUCCH configuration and/or the SDT-specific common PUCCH configuration based on whether the UE is configured with the SDT configuration, the RA configuration for SDT, and/or the CG configuration for SDT.

If the UE is configured with the SDT configuration, the RA configuration for SDT, and/or the CG configuration for SDT, the UE may apply the SDT-specific common PUCCH configuration (e.g., instead of the common PUCCH configuration).

If the UE is not configured with the SDT configuration, the RA configuration for SDT, and/or the CG configuration for SDT, the UE may apply the common PUCCH configuration (e.g., instead of the SDT-specific common PUCCH configuration).

(d) If the UE initiates/performs an RA-SDT/CG-SDT procedure on the initial BWP, the UE may determine whether to apply the common PUCCH configuration and/or the SDT-specific common PUCCH configuration based on whether the UE initiates/performs an SDT procedure.

If the UE initiates/performs an SDT procedure, the UE may apply the SDT-specific common PUCCH configuration (e.g., instead of the common PUCCH configuration).

If the UE does not initiate/perform an SDT procedure, the UE may apply the common PUCCH configuration (e.g., instead of the SDT-specific common PUCCH configuration).

(e) If the UE initiates/performs an RA-SDT/CG-SDT procedure on the initial BWP, the UE may determine whether to apply the common PUCCH configuration and/or the SDT-specific common PUCCH configuration based on whether the UE is configured with an SDT-specific search space (and/or whether the UE monitors an SDT-specific search space).

If the UE is configured with an SDT-specific search space (and/or the UE monitors an SDT-specific search space), the UE may apply the SDT-specific common PUCCH configuration (e.g., instead of the common PUCCH configuration).

If the UE is not configured with an SDT-specific search space (and/or the UE does not monitor an SDT-specific search space), the UE may apply the common PUCCH configuration (e.g., instead of the SDT-specific common PUCCH configuration).

The SDT-specific search space may be an SS configured in the RA configuration for SDT and/or the CG configuration for SDT and/or the SDT configuration.

(f) If the UE initiates/performs an RA procedure on the initial BWP, the UE may determine whether to apply the common PUCCH configuration and/or the SDT-specific common PUCCH configuration based on whether the RA procedure is initiated for SDT (and/or based on whether the PRACH/preamble of the RA procedure is transmitted on an RA resource configured for SDT).

If the RA procedure is initiated for SDT (and/or the PRACH/preamble of the RA procedure is transmitted on an RA resource configured for SDT), the UE may apply the SDT-specific common PUCCH configuration (e.g., instead of the common PUCCH configuration).

If the RA procedure is not initiated for SDT (and/or the PRACH/preamble of the RA procedure is not transmitted on an RA resource configured for SDT), the UE may apply the common PUCCH configuration (e.g., instead of the SDT-specific common PUCCH configuration).

(g) If the UE initiates/performs a CG procedure on the initial BWP, the UE may determine whether to apply the common PUCCH configuration and/or the SDT-specific common PUCCH configuration based on whether the CG procedure is initiated for SDT (and/or based on whether the UL transmission is performed via a CG resource configured for SDT).

If the CG procedure is initiated for SDT (and/or the UL transmission is performed via a CG resource configured for SDT), the UE may apply the SDT-specific common PUCCH configuration (e.g., instead of the common PUCCH configuration).

If the CG procedure is not initiated for SDT (and/or the UL transmission is not performed via a CG resource configured for SDT, the UE may apply the common PUCCH configuration (e.g., instead of the SDT-specific common PUCCH configuration).

In some implementations, if the UE initiates/performs an RA-SDT/CG-SDT procedure on the initial BWP, the UE may determine to transmit the HARQ feedback for the Msg4/MsgB/DL transmission according to the common PUCCH configuration and/or the SDT-specific common PUCCH configuration based on one or more of the following criteria (a)-(f).

(a) If the UE initiates/performs an RA-SDT/CG-SDT procedure on the initial BWP, the UE may determine to transmit the HARQ feedback for the Msg4/MsgB/DL transmission according to the common PUCCH configuration and/or the SDT-specific common PUCCH configuration based on whether the UE is configured with the SDT-specific common PUCCH configuration.

If the UE is configured with the SDT-specific common PUCCH configuration, the UE may transmit the HARQ feedback for the Msg4/MsgB/DL transmission based on the SDT-specific common PUCCH configuration (e.g., instead of the common PUCCH configuration).

If the UE is not configured with the SDT-specific common PUCCH configuration, the IE may transmit the HARQ feedback for the Msg4/MsgB/DL transmission based on the common PUCCH configuration (e.g., instead of the SDT-specific common PUCCH configuration).

(b) If the UE initiates/performs an RA-SDT/CG-SDT procedure on the initial BWP, the UE may determine to transmit the HARQ feedback for the Msg4/MsgB/DL transmission according to the common PUCCH configuration and/or the SDT-specific common PUCCH configuration based on whether the UE is configured with the SDT configuration, RA configuration for SDT, and/or CG configuration for SDT.

If the UE is configured with the SDT configuration, RA configuration for SDT, and/or CG configuration for SDT, the UE may transmit the HARQ feedback for the Msg4/MsgB/DL transmission based on the SDT-specific common PUCCH configuration (e.g., instead of the common PUCCH configuration).

If the UE is not configured with the SDT configuration, RA configuration for SDT, and/or CG configuration for SDT, the UE may transmit the HARQ feedback for the Msg4/MsgB/DL transmission based on the common PUCCH configuration (e.g., instead of the SDT-specific common PUCCH configuration).

(c) If the UE initiates/performs an RA-SDT/CG-SDT procedure on the initial BWP, the UE may determine to transmit the HARQ feedback for the Msg4/MsgB/DL transmission according to the common PUCCH configuration and/or the SDT-specific common PUCCH configuration based on whether the UE initiates/performs an SDT procedure.

If the UE initiates/performs an SDT procedure, the UE may transmit the HARQ feedback for the Msg4/MsgB/DL transmission based on the SDT-specific common PUCCH configuration (e.g., instead of the common PUCCH configuration).

If the UE does not initiate/perform an SDT procedure, the UE may transmit the HARQ feedback for the Msg4/MsgB/DL transmission based on the common PUCCH configuration (e.g., instead of the SDT-specific common PUCCH configuration).

(d) If the UE initiates/performs an RA-SDT/CG-SDT procedure on the initial BWP, the UE may determine to transmit the HARQ feedback for the Msg4/MsgB/DL transmission according to the common PUCCH configuration and/or the SDT-specific common PUCCH configuration based on whether the UE is configured with an SDT-specific search space (and/or whether the UE monitors an SDT-specific search space).

If the UE is configured with an SDT-specific search space (and/or the UE monitors an SDT-specific search space), the UE may transmit the HARQ feedback for the Msg4/MsgB/DL transmission based on the SDT-specific common PUCCH configuration (e.g., instead of the common PUCCH configuration).

If the UE is not configured with an SDT-specific search space (and/or the UE does not monitor an SDT-specific search space), the UE may transmit the HARQ feedback for the Msg4/MsgB/DL transmission based on the common PUCCH configuration (e.g., instead of the SDT-specific common PUCCH configuration).

The SDT-specific search space may be an SS configured in the RA configuration for SDT and/or the CG configuration for SDT and/or the SDT configuration.

(e) If the UE initiates/performs an RA procedure on the initial BWP, the UE may determine to transmit the HARQ feedback for the Msg4/MsgB/DL transmission according to the common PUCCH configuration and/or the SDT-specific common PUCCH configuration based on whether the RA procedure is initiated for SDT (and/or based on whether the PRACH/preamble of the RA procedure is transmitted on an RA resource configured for SDT).

If the RA procedure is initiated for SDT (and/or the PRACH/preamble of the RA procedure is transmitted on an RA resource configured for SDT), the UE may transmit the HARQ feedback for the Msg4/MsgB/DL transmission based on the SDT-specific common PUCCH configuration (e.g., instead of the common PUCCH configuration).

If the RA procedure is not initiated for SDT (and/or the PRACH/preamble of the RA procedure is not transmitted on an RA resource configured for SDT), the UE may transmit the HARQ feedback for the Msg4/MsgB/DL transmission based on the common PUCCH configuration (e.g., instead of the SDT-specific common PUCCH configuration).

(f) If the UE initiates/performs a CG procedure on the initial BWP, the UE may determine to transmit the HARQ feedback for the Msg4/MsgB/DL transmission according to the common PUCCH configuration and/or the SDT-specific common PUCCH configuration based on whether the CG procedure is initiated for SDT (and/or based on whether the UL transmission is performed via a CG resource configured for SDT).

If the CG procedure is initiated for SDT (and/or the UL transmission is performed via a CG resource configured for SDT), the UE may transmit the HARQ feedback for the Msg4/MsgB/DL transmission based on the SDT-specific common PUCCH configuration (e.g., instead of the common PUCCH configuration).

If the CG procedure is not initiated for SDT (and/or the UL transmission is not performed via a CG resource configured for SDT, the UE may transmit the HARQ feedback for the Msg4/MsgB/DL transmission based on the common PUCCH configuration (e.g., instead of the SDT-specific common PUCCH configuration).

In some implementations, the UE may be configured with a (SDT-specific) dedicated PUCCH configuration and/or a (SDT-specific) common PUCCH configuration on the dedicated BWP (for SDT). The dedicated BWP may be a specific BWP configured for SDT. The information (e.g., index) of the dedicated BWP may be indicated by an SDT configuration and/or an RA configuration of the SDT and/or a CG configuration of the SDT. The dedicated BWP may be indicated by a bwp-ID. In some implementations, if the UE initiates/performs an RA-SDT/CG-SDT procedure on the dedicated BWP, the UE may determine whether to apply a (SDT-specific) dedicated PUCCH configuration and/or a (SDT-specific) common PUCCH configuration based on one or more of the following (a)-(c).

(a) If the UE initiates/performs an RA-SDT/CG-SDT procedure on the dedicated BWP, the UE may determine whether to apply the (SDT-specific) dedicated PUCCH configuration and/or the (SDT-specific) common PUCCH configuration based on whether the UE is configured with the (SDT-specific) dedicated PUCCH configuration.

If the UE is configured with the (SDT-specific) dedicated PUCCH configuration, the UE may apply the (SDT-specific) dedicated PUCCH configuration (e.g., instead of the (SDT-specific) common PUCCH configuration).

If the UE is not configured with the SDT-specific common PUCCH configuration, the UE may apply the (SDT-specific) common PUCCH configuration (e.g., instead of the SDT-specific dedicated PUCCH configuration). The UE may apply SDT-specific common PUCCH configuration if the UE is configured with the SDT-specific common PUCCH configuration. The UE may apply common PUCCH configuration if the UE is not configured with the SDT-specific common PUCCH configuration.

(b) If the UE initiates/performs an RA-SDT/CG-SDT procedure on the dedicated BWP, the UE may apply both the (SDT-specific) dedicated PUCCH configuration and the (SDT-specific) common PUCCH configuration.

If the UE is configured with the (SDT-specific) dedicated PUCCH configuration and the (SDT-specific) common PUCCH configuration, the UE may use the PUCCH resources configured in the (SDT-specific) dedicated PUCCH configuration (e.g., and not use the PUCCH resources configured in the (SDT-specific) common PUCCH configuration) even if the UE applies both the (SDT-specific) dedicated PUCCH configuration and the (SDT-specific) common PUCCH configuration.

If the UE is configured with the (SDT-specific) dedicated PUCCH configuration and the (SDT-specific) common PUCCH configuration, the (SDT-specific) dedicated PUCCH configuration may configure the delta/updated parameters for the (SDT-specific) common PUCCH configuration. If the UE applies both the (SDT-specific) dedicated PUCCH configuration and the (SDT-specific) common PUCCH configuration, the UE may apply the delta/updated parameters configured by the (SDT-specific) dedicated PUCCH configuration to replace the parameters configured in the (SDT-specific) common PUCCH configuration.

(c) When the UE receives the DCI, the UE may determine whether a PUCCH resource indicator field values in the DCI maps to the values of a set of PUCCH resource indexes for SDT (e.g., provided by an sdt-resourceList or a resourceList for SDT) or a set of PUCCH resources indexes for non-SDT (e.g., provided by a resourceList) based on at least one of the following criteria (e.g., from Criterion (a) through Criterion (c)).

The set of PUCCH resource indexes for SDT may correspond to the PUCCH resources for SDT. The PUCCH resources for SDT may be configured in at least one of the sdt-PUCCH-Resource, sdt-PUCCH-ConfigCommon, and sdt-PUCCH-Config.

The set of PUCCH resource indexes for non-SDT may correspond to the PUCCH resources for non-SDT. The PUCCH resources for non-SDT may be configured in at least one of the PUCCH-Resource, PUCCH-ConfigCommon, and PUCCH-Config.

The PUCCH resources for SDT and the PUCCH resources for non-SDT may be separately configured.

Criterion (a): the UE is configured with the SDT configuration.

Criterion (b): the DCI is received during an SDT procedure.

Criterion (c): the DCI is received in the SDT-specific search space.

If none of the above-mentioned criteria is satisfied, the UE may determine that the PUCCH resource indicator field values in the DCI maps to the values of the set of PUCCH resources for non-SDT (e.g., provided by resourceList)

If at least one of the criteria is satisfied, the UE may determine that the PUCCH resource maps to the set of PUCCH resource indexes for SDT (e.g., provided by an sdt-resourceList or a resourceList for SDT).

In some implementations, if the UE initiates/performs an RA-SDT/CG-SDT procedure on the dedicated BWP, the UE may determine to transmit the HARQ feedback for the Msg4/MsgB/DL transmission according to the (SDT-specific) dedicated PUCCH configuration and/or the (SDT-specific) common PUCCH configuration based on one or more of the followings. If the UE initiates/performs an RA-SDT/CG-SDT procedure on the dedicated BWP, the UE may determine to transmit the HARQ feedback for the Msg4/MsgB/DL transmission according to the (SDT-specific) dedicated PUCCH configuration and/or the (SDT-specific) common PUCCH configuration based on whether the UE is configured with the (SDT-specific) dedicated PUCCH configuration. If the UE is configured with the (SDT-specific) dedicated PUCCH configuration, the UE may transmit the HARQ feedback for the Msg4/MsgB/DL transmission based on the (SDT-specific) dedicated PUCCH configuration (e.g., instead of the (SDT-specific) common PUCCH configuration). If the UE is not configured with the (SDT-specific) dedicated PUCCH configuration, the UE may transmit the HARQ feedback for the Msg4/MsgB/DL transmission based on the (SDT-specific) common PUCCH configuration (e.g., instead of the (SDT-specific) dedicated PUCCH configuration).

PUCCH for HARQ Feedback

In some implementations, a UE may be configured with two different TA timers (e.g., based on two different configurations/IEs) for the maintenance of the UL time alignment. The two different TA timers may include a TA timer and an SDT TA timer. The TA timer may be configured per TAG, per serving cell, per MAC entity, and/or per UE. The TA timer may be used to control the time duration (e.g., for how long) the UE/MAC entity considers the Serving Cells belonging to the associated TAG to be uplink time aligned. The TA timer may be configured by an IE timeAlignmentTimer and/or timeAlignmentTimerCommon. The TA timer may be configured by system information (e.g., SIB1) via an IE UplinkConfigCommonSIB. The TA timer may be configured by TAG-config, MAC-CellGroupConfig, CellGroupConfig, and/or RRCReconfiguration.

The unit of the TA timer may be s (seconds), ms (milliseconds), subframe, slot, or symbol. The value of the TA timer may include infinity. The SDT TA timer may be configured per TAG, per serving cell, per MAC entity, and/or per UE. The SDT TA timer may be used to control the time duration the UE/MAC entity considers for the uplink transmission for SDT (and/or in the RRC_INACTIVE state) to be uplink time aligned. The SDT may be referred to as an RA-SDT and/or a CG-SDT. The SDT TA timer may be configured by an IE SDT-TimeAlignmentTimer, RA-SDT-TimeAlignmentTimer, and/or CG-SDT-TimeAlignmentTimer. The SDT TA timer may also be called as RA-SDT TA timer and/or CG-SDT TA timer.

The SDT TA timer may be configured by a dedicated RRC configuration. The SDT TA timer may be configured by an SDT configuration (e.g., an sdt-Config). The UE may receive an RRC message (e.g., an RRC release message with suspend configuration) including the SDT configuration. The SDT TA timer may be configured by an RRC release message (with/without suspend configuration). The SDT TA timer may be configured by system information (e.g., SIB1 or other SI). The SDT TA timer may be configured by a common SDT configuration (e.g., an sdt-ConfigCommon). The UE may receive the system information (e.g., SIB1 or other SI) including the common SDT configuration. The SDT TA timer may be a cell-specific parameter. The SDT TA timer may be configured in an RA configuration for SDT (e.g., RACH-ConfigSDT) and/or a CG configuration for SDT (e.g., CG-SDT-Config). The UE may receive the system information (e.g., SIB1 or other SI) including the RA configuration for SDT and/or the CG configuration for SDT. The UE may receive an RRC message (e.g., an RRC release message with suspend configuration) including the RA configuration for SDT and/or the CG configuration for SDT.

The unit of the SDT TA timer may be s, ms, subframe, slot, symbol, and/or multiplies of periodicity of a CG-SDT configuration. The value of the SDT TA timer may include infinity. The unit and/or the value/length of the SDT TA timer may be configured the same way as the TA timer.

The UE/MAC entity may not perform any uplink transmission on a serving cell when the TA timer associated with the TAG to which this serving cell belongs is not running. The UE/MAC entity may perform small data transmission (e.g., CG-SDT, RA-SDT, UL transmission in SDT procedure) on the serving cell when the SDT TA timer is running. When the TA timer associated with the PTAG is not running and when the SDT TA timer is not running, the UE/MAC entity may not perform any uplink transmission on any serving cell except the RA preamble and MSGA transmission on the SpCell. If the UE is configured with the SDT but not configured with an SDT TA timer (e.g., in the SDT configuration or in the CG-SDT configuration), the UE may use the TA timer for the SDT procedure.

In some implementations, when a transmission takes place for a HARQ process, one or two (e.g., for a downlink spatial multiplexing) TBs and the associated HARQ information may be received by the MAC entity of the UE from the HARQ entity of the UE. The UE may then determine whether to transmit the HARQ feedback (e.g., the MAC entity of the UE instructs the physical layer of the UE to generate acknowledgement(s)) of the data in the TB to the NW if a TA timer ((e.g., associated with a TAG containing a serving cell on which the HARQ feedback is to be transmitted) is stopped/expired.

If the TA timer is stopped/expired, the UE may not transmit the HARQ feedback (e.g., HARQ-ACK and/or HARQ-NACK) of the data in the TB to the NW. If the TA timer is stopped/expired, the MAC entity of the UE may not instruct the physical layer of the UE to generate acknowledgement(s) of the data in the TB. If the TA timer is running, the UE may transmit the HARQ feedback (e.g., HARQ-ACK and/or HARQ-NACK) of the data in the TB to the NW. If the TA timer is running, the MAC entity of the UE may instruct the physical layer of the UE to generate acknowledgement(s) of the data in the TB.

For the SDT, a UE may be configured with two different TA timers (e.g., based on two different configurations/IEs) for the maintenance of UL time alignment. One of the two TA timers may include the TA timer as discussed in the present disclosure, and the other may include an SDT TA timer as discussed in the present disclosure. Some implementations of the present disclosure, as discussed below, provide how the UE may determine whether to transmit the HARQ feedback (and/or whether the MAC entity of the UE to instruct the physical layer of the UE to generate acknowledgement(s) of the data in the TB) to the NW based on the (1) TA timer and/or the (2) SDT TA timer.

The HARQ feedback may be transmitted via an SDT-specific common PUCCH configuration (e.g., sdt-pucch-ConfigCommon) and/or an SDT-specific dedicated PUCCH configuration (e.g., pucch-Config and/or sdt-pucch-Config). The HARQ feedback may be in response to a DL data/TB (e.g., including small data) during an SDT procedure. The DCI (e.g., including the PUCCH resource indicator) that indicates the PUCCH resource for the HARQ feedback may be received on a search space, specifically for (RA-/CG-) SDT. The DCI (e.g., including the PUCCH resource indicator) that indicates the PUCCH resource for HARQ feedback may be received when a timer/time window for the CG-SDT is running.

In some implementations, the UE may determine whether to transmit the HARQ feedback (and/or whether the MAC entity of the UE to instruct the physical layer of the UE to generate acknowledgement(s) of the data in the TB) to the NW based on (only) the TA timer. In other words, the SDT TA timer may not be used by the UE to determine whether the HARQ feedback can be transmitted (and/or whether the MAC entity of the UE can instruct the physical layer of the UE to generate acknowledgement(s) of the data in the TB) to the NW.

After the UE initiates an RA procedure for SDT, the UE may monitor a PDCCH for the DCI (e.g., DCI format 10), and the DCI may schedule an Msg4/MsgB (e.g., PDSCH reception with the UE contention resolution identity). After the UE receives the Msg4/MsgB based on the DCI, the UE may determine whether to transmit the HARQ feedback (and/or whether the MAC entity of the UE to instruct the physical layer of the UE to generate acknowledgement(s) of the data in the TB) in response to the Msg4/MsgB based on the TA timer. After the UE receives the Msg4/MsgB based on the DCI, the UE may transmit the HARQ feedback (and/or the MAC entity of the UE may instruct the physical layer of the UE to generate acknowledgement(s) of the data in the TB) in response to the Msg4/MsgB if the TA timer is running. After the UE receives the Msg4/MsgB based on the DCI, the UE may not transmit the HARQ feedback (and/or the MAC entity of the UE may not instruct the physical layer of the UE to generate acknowledgement(s) of the data in the TB) in response to the Msg4/MsgB if the TA timer is stopped/expired.

After the UE initiates an RA procedure for SDT and/or completes the RA procedure for SDT, the UE may monitor a PDCCH for the DCI, and the DCI may schedule a DL signal on the PDSCH (e.g., during the subsequent transmission period of the SDT procedure). After the UE receives the DL signal based on the DCI, the UE may determine whether to transmit the HARQ feedback (and/or whether the MAC entity of the UE to instruct the physical layer of the UE to generate acknowledgement(s) of the data in the TB) in response to the DL signal based on the TA timer. After the UE receives the DL signal based on the DCI, the UE may transmit the HARQ feedback (and/or the MAC entity of the UE may instruct the physical layer of the UE to generate acknowledgement(s) of the data in the TB) in response to the DL signal if the TA timer is running. After the UE receives the DL signal based on the DCI, the UE may not transmit the HARQ feedback (and/or the MAC entity of the UE may not instruct the physical layer of the UE to generate acknowledgement(s) of the data in the TB) in response to the DL signal if the TA timer is stopped/expired.

After the UE initiates a CG-SDT procedure (e.g., initiates an SDT with the CG type 1 resource), the UE may monitor a PDCCH for the DCI (e.g., during a window/timer for CG-SDT), and the DCI may schedule a DL signal on the PDSCH (e.g., during the subsequent transmission period of the SDT procedure). After the UE receives the DL signal based on the DCI (e.g., during a window/timer for CG-SDT), the UE may determine whether to transmit the HARQ feedback (and/or whether the MAC entity of the UE to instruct the physical layer of the UE to generate acknowledgement(s) of the data in the TB) in response to the DL signal based on the TA timer. After the UE receives the DL signal based on the DCI, the UE may transmit the HARQ feedback (and/or the MAC entity of the UE may instruct the physical layer of the UE to generate acknowledgement(s) of the data in the TB) in response to the DL signal if the TA timer is running. After the UE receives the DL signal based on the DCI, the UE may not transmit the HARQ feedback (and/or the MAC entity of the UE may not instruct the physical layer of the UE to generate acknowledgement(s) of the data in the TB) in response to the DL signal if the TA timer is stopped/expired.

In some implementations, the UE may determine whether to transmit the HARQ feedback (and/or whether the MAC entity of the UE to instruct the physical layer of the UE to generate acknowledgement(s) of the data in the TB) to the NW based on (only) the SDT TA timer. In other words, the TA timer may not be used by the UE to determine whether the HARQ feedback can be transmitted (and/or whether the MAC entity of the UE can instruct the physical layer of the UE to generate acknowledgement(s) of the data in the TB) to the NW.

After the UE initiates an RA procedure for SDT, the UE may monitor a PDCCH for a DCI (e.g., DCI format 10), and the DCI may schedule an Msg4/MsgB (e.g., PDSCH reception with the UE contention resolution identity). After the UE receives the Msg4/MsgB based on the DCI, the UE may determine whether to transmit the HARQ feedback (and/or whether the MAC entity of the UE to instruct the physical layer of the UE to generate acknowledgement(s) of the data in the TB) in response to the Msg4/MsgB based on the SDT TA timer. After the UE receives the Msg4/MsgB based on the DCI, the UE may transmit the HARQ feedback (and/or the MAC entity of the UE may instruct the physical layer of the UE to generate acknowledgement(s) of the data in the TB) in response to the Msg4/MsgB if the SDT TA timer is running. After the UE receives the Msg4/MsgB based on the DCI, the UE may not transmit the HARQ feedback (and/or the MAC entity of the UE may not instruct the physical layer of the UE to generate acknowledgement(s) of the data in the TB) in response to the Msg4/MsgB if the SDT TA timer is stopped/expired.

After the UE initiates an RA procedure for SDT and/or completes the RA procedure for SDT, the UE may monitor a PDCCH for a DCI, and the DCI may schedule a DL signal on the PDSCH (e.g., during the subsequent transmission period of the SDT procedure). After the UE receives the DL signal based on the DCI, the UE may determine whether to transmit the HARQ feedback (and/or whether the MAC entity of the UE to instruct the physical layer of the UE to generate acknowledgement(s) of the data in the TB) in response to the DL signal based on the SDT TA timer. After the UE receives the DL signal based on the DCI, the UE may transmit the HARQ feedback (and/or the MAC entity of the UE may instruct the physical layer of the UE to generate acknowledgement(s) of the data in the TB) in response to the DL signal if the SDT TA timer is running. After the UE receives the DL signal based on the DCI, the UE may not transmit the HARQ feedback (and/or the MAC entity of the UE may not instruct the physical layer of the UE to generate acknowledgement(s) of the data in the TB) in response to the DL signal if the SDT TA timer is stopped/expired.

After the UE initiates a CG-SDT procedure (e.g., initiates an SDT with the CG type 1 resource), the UE may monitor a PDCCH for the DCI (e.g., during a window/timer for CG-SDT), and the DCI may schedule a DL signal on the PDSCH (e.g., during the subsequent transmission period of the SDT procedure). After the UE receives the DL signal based on the DCI (e.g., during a window/timer for CG-SDT), the UE may determine whether to transmit the HARQ feedback (and/or whether the MAC entity of the UE to instruct the physical layer of the UE to generate acknowledgement(s) of the data in the TB) in response to the DL signal based on the SDT TA timer. After the UE receives the DL signal based on the DCI, the UE may transmit the HARQ feedback (and/or the MAC entity of the UE may instruct the physical layer of the UE to generate acknowledgement(s) of the data in the TB) in response to the DL signal if the SDT TA timer is running. After the UE receives the DL signal based on the DCI, the UE may not transmit the HARQ feedback (and/or the MAC entity of the UE may not instruct the physical layer of the UE to generate acknowledgement(s) of the data in the TB) in response to the DL signal if the SDT TA timer is stopped/expired.

In some implementations, the UE may determine whether to transmit the HARQ feedback (and/or whether the MAC entity of the UE to instruct the physical layer of the UE to generate acknowledgement(s) of the data in the TB) to the NW based on the TA timer and the SDT TA timer.

After the UE initiates an RA procedure for SDT, the UE may monitor a PDCCH for the DCI (e.g., DCI format 10), and the DCI may schedule an Msg4/MsgB (e.g., PDSCH reception with the UE contention resolution identity). After the UE receives the Msg4/MsgB based on the DCI, the UE may determine whether to transmit the HARQ feedback (and/or whether the MAC entity of the UE to instruct the physical layer of the UE to generate acknowledgement(s) of the data in the TB) in response to the Msg4/MsgB based on the TA timer and the SDT TA timer.

After the UE receives the Msg4/MsgB based on the DCI, the UE may transmit the HARQ feedback (and/or the MAC entity of the UE may instruct the physical layer of the UE to generate acknowledgement(s) of the data in the TB) in response to the Msg4/MsgB if the TA timer is running and the SDT TA timer is running.

After the UE receives the Msg4/MsgB based on the DCI, the UE may transmit the HARQ feedback (and/or the MAC entity of the UE may instruct the physical layer of the UE to generate acknowledgement(s) of the data in the TB) in response to the Msg4/MsgB if the TA timer is running, but the SDT TA timer is not running. After the UE receives the Msg4/MsgB based on the DCI, the UE may not transmit the HARQ feedback (and/or the MAC entity of the UE may not instruct the physical layer of the UE to generate acknowledgement(s) of the data in the TB) in response to the Msg4/MsgB if the TA timer is running, but the SDT TA timer is not running.

After the UE receives the Msg4/MsgB based on the DCI, the UE may transmit the HARQ feedback (and/or the MAC entity of the UE may instruct the physical layer of the UE to generate acknowledgement(s) of the data in the TB) in response to the Msg4/MsgB if the TA timer is not running, but the SDT TA timer is running. After the UE receives the Msg4/MsgB based on the DCI, the UE may not transmit the HARQ feedback (and/or the MAC entity of the UE may not instruct the physical layer of the UE to generate acknowledgement(s) of the data in the TB) in response to the Msg4/MsgB if the TA timer is not running, but the SDT TA timer is running.

After the UE receives the Msg4/MsgB based on the DCI, the UE may not transmit the HARQ feedback (and/or the MAC entity of the UE may not instruct the physical layer of the UE to generate acknowledgement(s) of the data in the TB) in response to the Msg4/MsgB if the TA timer is not running and the SDT TA timer is not running. After the UE initiates an RA procedure for SDT and/or completes the RA procedure for SDT, the UE may monitor a PDCCH for the DCI, and the DCI may schedule a DL signal on the PDSCH (e.g., during the subsequent transmission period of the SDT procedure). After the UE receives the DL signal based on the DCI, the UE may determine whether to transmit the HARQ feedback (and/or whether the MAC entity of the UE to instruct the physical layer of the UE to generate acknowledgement(s) of the data in the TB) in response to the DL signal based on the TA timer and the SDT TA timer. After the UE initiates a CG-SDT procedure (e.g., initiates an SDT with the CG type 1 resource), the UE may monitor a PDCCH for the DCI (e.g., during a window/timer for CG-SDT), and the DCI may schedule a DL signal on the PDSCH (e.g., during the subsequent transmission period of the SDT procedure). After the UE receives the DL signal based on the DCI (e.g., during a window/timer for CG-SDT), the UE may determine whether to transmit the HARQ feedback (and/or whether the MAC entity of the UE to instruct the physical layer of the UE to generate acknowledgement(s) of the data in the TB) in response to the DL signal based on the TA timer and the SDT TA timer.

After the UE receives the DL signal based on the DCI, the UE may transmit the HARQ feedback (and/or the MAC entity of the UE may instruct the physical layer of the UE to generate acknowledgement(s) of the data in the TB) in response to the DL signal if the TA timer is running and the SDT TA timer is running.

After the UE receives the DL signal based on the DCI, the UE may transmit the HARQ feedback (and/or the MAC entity of the UE may instruct the physical layer of the UE to generate acknowledgement(s) of the data in the TB) in response to the DL signal if the TA timer is running, but the SDT TA timer is not running. After the UE receives the DL signal based on the DCI, the UE may not transmit the HARQ feedback (and/or the MAC entity of the UE may not instruct the physical layer of the UE to generate acknowledgement(s) of the data in the TB) in response to the DL signal if the TA timer is running, but the SDT TA timer is not running.

After the UE receives the DL signal based on the DCI, the UE may transmit the HARQ feedback (and/or the MAC entity of the UE may instruct the physical layer of the UE to generate acknowledgement(s) of the data in the TB) in response to the Msg4/MsgB if the TA timer is not running, but the SDT TA timer is running. After the UE receives the DL signal based on the DCI, the UE may not transmit the HARQ feedback (and/or the MAC entity of the UE may not instruct the physical layer of the UE to generate acknowledgement(s) of the data in the TB) in response to the DL signal if the TA timer is not running, but the SDT TA timer is running.

After the UE receives the DL signal based on the DCI, the UE may not transmit the HARQ feedback (and/or the MAC entity of the UE may not instruct the physical layer of the UE to generate acknowledgement(s) of the data in the TB) in response to the Msg4/MsgB if the TA timer is not running and the SDT TA timer is not running.

In some implementations, the UE may determine whether the UE is configured with a PUCCH configuration before the UE determines whether to transmit the HARQ feedback (and/or whether the MAC entity of the UE to instruct the physical layer of the UE to generate acknowledgement(s) of the data in the TB) to the NW based on the TA timer and/or the SDT TA timer.

If the UE is configured with the PUCCH configuration, the UE may further determine whether to transmit the HARQ feedback (and/or whether the MAC entity of the UE to instruct the physical layer of the UE to generate acknowledgement(s) of the data in the TB) to the NW based on the TA timer and/or the SDT TA timer. If the UE is not configured with the PUCCH configuration, the UE may not further determine whether to transmit the HARQ feedback (and/or whether the MAC entity of the UE to instruct the physical layer of the UE to generate acknowledgement(s) of the data in the TB) to the NW based on the TA timer and/or the SDT TA timer. The PUCCH configuration may be referred to as one or more of the following (a)-(d).

(a) a common PUCCH configuration (e.g., pucch-ConfigCommon).

(b) a dedicated PUCCH configuration (e.g., pucch-Config).

(c) an SDT-specific common PUCCH configuration (e.g., sdt-pucch-ConfigCommon).

(d) an SDT-specific dedicated PUCCH configuration (e.g., pucch-Config and/or sdt-pucch-Config).

PUCCH Release/No PUCCH

In some implementations, the UE may determine whether to release one or more PUCCHs (e.g., a PUCCH resource for the HARQ feedback, a PUCCH-CSI-Resource, an SR resource, and/or an SRS resource) when an SDT TA timer and/or a TA timer expires (e.g., during the time the UE is performing an SDT procedure (e.g., an RA-SDT and/or a CG-SDT)).

In some implementations, the MAC entity of the UE may notify the RRC entity of the UE to release one or more of PUCCHs (e.g., a PUCCH resource for the HARQ feedback, a PUCCH-CSI-Resource, an SR resource, and/or an SRS resource) when an SDT TA timer and/or a TA timer expires (e.g., while the UE is performing an SDT procedure (e.g., RA-SDT and/or CG-SDT)). Upon receiving a PUCCH release request from MAC entity of the UE, the RRC entity of the UE may release the one or more PUCCHs (e.g., a PUCCH resource for the HARQ feedback, a PUCCH-CSI-Resource, an SR resource, and/or an SRS resource). The released PUCCH, the a PUCCH resource for the HARQ feedback, a PUCCH-CSI-Resource, an SR resource, and/or an SRS resource may be configured by one or more of the following configurations (a)-(d).

(a) a common PUCCH configuration (e.g., pucch-ConfigCommon).

(b) a dedicated PUCCH configuration (e.g., pucch-Config).

(c) an SDT-specific common PUCCH configuration (e.g., sdt-pucch-ConfigCommon).

(d) an SDT-specific dedicated PUCCH configuration (e.g., pucch-Config and/or sdt-pucch-Config).

In some implementations, when an SDT TA timer and/or a TA timer expires, the MAC entity may notify RRC entity to release PUCCH (e.g., a PUCCH resource for the HARQ feedback, a PUCCH-CSI-Resource, an SR resource, and/or an SRS resource). In some implementations, upon the RRC entity receives a PUCCH release request/SRS release request from the MAC entity, the RRC entity may release PUCCH (e.g., a PUCCH resource for the HARQ feedback, a PUCCH-CSI-Resource, an SR resource, and/or an SRS resource).

In some implementations, the UE may or may not release one or more PUCCHs (e.g., a PUCCH resource for the HARQ feedback, a PUCCH-CSI-Resource, an SR resource, and/or an SRS resource) when an SDT TA timer and/or a TA timer expires, based on whether the UE is performing an SDT procedure. The UE may or may not release one or more PUCCHs (e.g., a PUCCH resource for the HARQ feedback, a PUCCH-CSI-Resource, an SR resource, and/or an SRS resource) when an SDT TA timer and/or a TA timer expires (e.g., while the UE is performing an SDT procedure (e.g., RA-SDT and/or CG-SDT)).

In some implementations, the UE may or may not release one or more PUCCHs (e.g., a PUCCH resource for the HARQ feedback, a PUCCH-CSI-Resource, an SR resource, and/or an SRS resource) when an SDT TA timer and/or a TA timer expires based on the RRC states. The UE may not release one or more of PUCCHs (e.g., a PUCCH resource for the HARQ feedback, a PUCCH-CSI-Resource, an SR resource, and/or an SRS resource) when an SDT TA timer and/or a TA timer expires, when the UE is in the RRC_INACTIVE state. The UE may release one or more of PUCCHs (e.g., a PUCCH resource for the HARQ feedback, a PUCCH-CSI-Resource, an SR resource, and/or an SRS resource) when an SDT TA timer and/or a TA timer expires, for example, while the UE is in the RRC_CONNECTED state.

In some implementations, the UE may or may not release one or more PUCCHs (e.g., a PUCCH resource for the HARQ feedback, a PUCCH-CSI-Resource, an SR resource, and/or an SRS resource) when an SDT TA timer and/or a TA timer expires based on the BWPs. The UE may or may not release one or more PUCCHs (e.g., a PUCCH resource for the HARQ feedback, a PUCCH-CSI-Resource, an SR resource, and/or an SRS resource) configured for a dedicated BWP of an indicated serving cell and/or all the serving cells when an SDT TA timer and/or a TA timer expires (e.g., while the UE is performing an SDT procedure (e.g., an RA-SDT and/or a CG-SDT)). The dedicated BWP may be a specific BWP configured for SDT. The information (e.g., index) of the dedicated BWP may be indicated by an SDT configuration and/or an RA configuration of the SDT and/or a CG configuration of the SDT. The dedicated BWP may be indicated by a bwp-ID. The UE may or may not release one or more PUCCHs (e.g., a PUCCH resource for the HARQ feedback, a PUCCH-CSI-Resource, an SR resource, and/or an SRS resource) configured for an initial BWP when an SDT TA timer and/or a TA timer expires (e.g., while the UE is performing an SDT procedure (e.g., an RA-SDT and/or a CG-SDT)). The initial BWP may be referred to as BWP #0. The initial BWP may be configured by an initialUplinkBWP and/or an initialDownlinkBWP. The UE may or may not release one or more of PUCCHs (e.g., a PUCCH resource for the HARQ feedback, a PUCCH-CSI-Resource, an SR resource, and/or an SRS resource) configured for all BWPs of an indicated serving cell and/or all the serving cells when an SDT TA timer and/or a TA timer expires (e.g., while the UE is performing an SDT procedure (e.g., RA-SDT and/or CG-SDT)).

In some implementations, the UE may determine whether to release one or more PUCCHs configured for SDT (e.g., a PUCCH resource for the HARQ feedback, a PUCCH-CSI-Resource, an SR resource, and/or an SRS resource) based on one or more of the following conditions (a)-(g).

(a) the UE may release one or more PUCCHs configured for SDT (e.g., a PUCCH resource for the HARQ feedback, a PUCCH-CSI-Resource, an SR resource, and/or an SRS resource) when the SDT procedure is terminated/stopped/cancelled/failed/abort. The SDT procedure may be a CG-SDT and/or an RA-SDT.

(b) the UE may release one or more PUCCHs configured for SDT (e.g., a PUCCH resource for the HARQ feedback, a PUCCH-CSI-Resource, an SR resource, and/or an SRS resource) when a CG resource/configuration (for SDT) is released/suspended.

(c) the UE may release one or more PUCCHs configured for SDT (e.g., a PUCCH resource for the HARQ feedback, a PUCCH-CSI-Resource, an SR resource, and/or an SRS resource) when the UE performs cell reselection.

(d) the UE may release one or more PUCCHs configured for SDT (e.g., a PUCCH resource for the HARQ feedback, a PUCCH-CSI-Resource, an SR resource, and/or an SRS resource) when a max retransmission has been reached (in RLC) (e.g., if RETX_COUNT=maxRetxThreshold).

(e) the UE may release one or more PUCCHs configured for SDT (e.g., a PUCCH resource for the HARQ feedback, a PUCCH-CSI-Resource, an SR resource, and/or an SRS resource) when receiving a message from the NW.

The message may be RRCResume, RRCSetup, RRCRelease, RRCRelease with suspendConfig and/or RRCReject message.

(f) the UE may release one or more PUCCHs configured for SDT (e.g., a PUCCH resource for the HARQ feedback, a PUCCH-CSI-Resource, an SR resource, and/or an SRS resource) when the UE switches a CG-SDT procedure to an RA-SDT procedure and/or to a non-SDT procedure (e.g., an RRC connection resume procedure).

(g) the UE may release one or more PUCCHs configured for SDT (e.g., a PUCCH resource for the HARQ feedback, a PUCCH-CSI-Resource, an SR resource, and/or an SRS resource) when a timer/time window for SDT expires.

The timer/time window may be an SDT failure detection timer. The timer/time window may be specifically configured for SDT. The value of the timer/time window may be configured via an RRC release message. The value of the timer/time window may be configured via an RRC release message with suspend configuration. The value of the timer/time window may be configured via a configuration for SDT. The value of the timer/time window may be configured via a RACH configuration for SDT. The value of the timer/time window may be configured via a CG configuration for SDT. The value of the timer/time window may be configured via an IE UE-TimersAndConstants. The value of the timer/time window may be configured via a system information (e.g., a SIB). The timer/time window may be TA timer, ra-ResponseWindow, msgB-ResponseWindow, ra-ContentionResolutionTimer, configuredGrantTimer, cg-RetransmissionTimer, drx-onDurationTimer, drx-InactivityTimer, drx-RetransmissionTimerDL, drx-RetransmissionTimerUL, T300, T301, T302, T304, T310, T311, T312, T316, T319, T320, T321, T322, T325, T330, T331, T342, T345, and/or a new Timer. The timer/time window may be used for monitoring a response (e.g., for (HARQ) ACK/NACK). The timer/time window may be a response window. The timer/time window may be used for receiving a PDCCH/scheduling (e.g., for new transmission or retransmission) from the NW.

In some implementations, the NW may not configure the PUCCH resource for HARQ feedback (e.g., resourceList and/or PUCCH-Resource set), PUCCH-CSI-Resource (e.g., in CSI-ReportConfig), SR resource (e.g., in SchedulingRequestResourceConfig), and/or SRS resource (e.g., in SRS-Config) in a PUCCH configuration for SDT. The UE may not be configured with the PUCCH resource for HARQ feedback (e.g., resourceList and/or PUCCH-Resource set), PUCCH-CSI-Resource (e.g., in CSI-ReportConfig), SR resource (e.g., in SchedulingRequestResourceConfig), and/or SRS resource (e.g., in SRS-Config) in a PUCCH configuration for SDT. The field(s) of the PUCCH resource for HARQ feedback (e.g., resourceList and/or PUCCH-Resource set), PUCCH-CSI-Resource (e.g., in CSI-ReportConfig), SR resource (e.g., in SchedulingRequestResourceConfig), and/or SRS resource (e.g., in SRS-Config) may be absent in a PUCCH configuration for SDT.

In some implementations, the UE may not apply/use/activate/store the PUCCH resource for HARQ feedback (e.g., resourceList and/or PUCCH-Resource set), PUCCH-CSI-Resource (e.g., in CSI-ReportConfig), SR resource (e.g., in SchedulingRequestResourceConfig), and/or SRS resource (e.g., in SRS-Config) in a PUCCH configuration for SDT. The UE may not perform the UL transmission via the PUCCH resource for HARQ feedback (e.g., resourceList and/or PUCCH-Resource set), PUCCH-CSI-Resource (e.g., in CSI-ReportConfig), SR resource (e.g., in SchedulingRequestResourceConfig), and/or SRS resource (e.g., in SRS-Config) in an SDT procedure. The UE may release t the PUCCH resource for HARQ feedback (e.g., resourceList and/or PUCCH-Resource set), PUCCH-CSI-Resource (e.g., in CSI-ReportConfig), SR resource (e.g., in SchedulingRequestResourceConfig), and/or SRS resource (e.g., in SRS-Config) after initiating an SDT procedure or when performing an SDT procedure. The UE may consider there is no valid PUCCH resource for HARQ feedback (e.g., resourceList and/or PUCCH-Resource set), PUCCH-CSI-Resource (e.g., in CSI-ReportConfig), SR resource (e.g., in SchedulingRequestResourceConfig), and/or SRS resource (e.g., in SRS-Config) after initiating an SDT procedure or when performing an SDT procedure. If an SR is pending/triggered, the UE may initiate an RA procedure and cancel the pending/triggered SR after initiating an SDT procedure or when performing an SDT procedure.

Flush HARQ Buffer Based on SDT TA Timer and/or TA Timer

In some implementations, in a case that the UE is performing an SDT procedure (and/or the UE is in the RRC_INACTIVE state), the UE may flush HARQ buffer when an SDT TA timer and/or a TA timer expires based on one or more of the following (a)-(g).

(a) In a case that the UE is performing an SDT procedure (and/or the UE is in the RRC_INACTIVE state), when an SDT TA timer and/or a TA timer expires, the UE may flush all HARQ buffers.

(b) In a case that the UE is performing an SDT procedure (and/or the UE is in the RRC_INACTIVE state), when an SDT TA timer and/or a TA timer expires, the UE may flush all HARQ buffers for all serving cells.

(c) In a case that the UE is performing an SDT procedure (and/or the UE is in the RRC_INACTIVE state), when an SDT TA timer and/or a TA timer expires, the UE may flush all HARQ buffers configured for RA-SDT, CG-SDT, and/or SDT.

The information of the HARQ buffers used for RA-SDT, CG-SDT, and/or SDT (e.g., the (maximum) number of the HARQ processes, the list of the HARQ processes) may be configured in the SDT configuration, RA configuration for SDT, and/or CG configuration for SDT.

(d) In a case that the UE is performing an SDT procedure (and/or the UE is in the RRC_INACTIVE state), when an SDT TA timer and/or a TA timer expires, the UE may flush all HARQ buffers configured for a serving cell that the UE is performing the (RA-SDT, CG-SDT, and/or SDT) SDT procedure on.

(e) In a case that the UE is performing an SDT procedure (and/or the UE is in the RRC_INACTIVE state), when an SDT TA timer and/or a TA timer expires, the UE may flush all HARQ buffers configured for a serving cell which is configured with the SDT configuration/resource.

(f) In a case that the UE is performing an SDT procedure (and/or the UE is in the RRC_INACTIVE state), when an SDT TA timer and/or a TA timer expires, the UE may flush all HARQ buffers configured for an SpCell (e.g., PCell and/or PSCell).

(g) In a case that the UE is performing an SDT procedure (and/or the UE is in the RRC_INACTIVE state), when an SDT TA timer and/or a TA timer expires, the UE may flush all HARQ buffers expect for a specific HARQ buffer.

The specific HARQ buffer may be the HARQ buffer with a specific index (e.g., 0). The specific HARQ buffer may be used to transmit the initial transmission (e.g., including CCCH message/RRC resume request message) of the RA-SDT and/or CG-SDT.

In some implementations, when a configured SDT TA timer of a UE expires, the UE may also consider a configured TA timer as expired. When a configured TA timer of a UE expires, the UE may also consider the configured SDT TA timer as expired.

In some implementations, the UE may determine whether to flush HARQ buffer based on one or more of the following conditions (a)-(g).

(a) The UE may flush HARQ buffer when the SDT procedure is terminated/stopped/cancelled/failed/abort.

(b) The UE may flush HARQ buffer when a CG resource/configuration (for SDT) is released/suspended.

(c) The UE may flush HARQ buffer when the UE performs cell reselection.

(d) The UE may flush HARQ buffer when a max retransmission has been reached (in RLC) (e.g., if RETX_COUNT=maxRetxThreshold).

(e) The UE may flush HARQ buffer when the UE switches a CG-SDT procedure to an RA-SDT procedure and/or to a non-SDT procedure (e.g., an RRC connection resume procedure).

(f) The UE may flush HARQ buffer when receiving a message from the NW.

The message may be RRCResume, RRCSetup, RRCRelease, RRCRelease with suspendConfig and/or RRCReject message.

(g) The UE may flush HARQ buffer when a timer/time window for SDT expires.

The timer/time window may be an SDT failure detection timer. The timer/time window may be specifically configured for SDT. The value of the timer/time window may be configured via an RRC release message. The value of the timer/time window may be configured via an RRC release message with suspend configuration. The value of the timer/time window may be configured via a configuration for SDT. The value of the timer/time window may be configured via a RACH configuration for SDT. The value of the timer/time window may be configured via a CG configuration for SDT. The value of the timer/time window may be configured via an IE UE-TimersAndConstants. The value of the timer/time window may be configured via a system information (e.g., a SIB). The timer/time window may be TA timer, ra-ResponseWindow, msgB-ResponseWindow, ra-ContentionResolutionTimer, configuredGrantTimer, cg-RetransmissionTimer, drx-onDurationTimer, drx-InactivityTimer, drx-RetransmissionTimerDL, drx-RetransmissionTimerUL, T300, T301, T302, T304, T310, T311, T312, T316, T319, T320, T321, T322, T325, T330, T331, T342, T345, and/or a new Timer. The timer/time window may be used for monitoring a response (e.g., for (HARQ) ACK/NACK). The timer/time window may be a response window. The timer/time window may be used for receiving a PDCCH/scheduling (e.g., for new transmission or retransmission) from the NW.

UE Behavior on an SDT TA Timer and/or a TA Timer

The SDT TA timer and/or a TA timer may be (re-)started when the UE receives an RRC release message (e.g., with suspend configuration.) The RRC release message may include a configuration(s) for SDT. The SDT TA timer and/or TA timer may be (re-)started when the SDT procedure is initiated. The SDT TA timer and/or TA timer may be (re-)started when the RA procedure is initiated. The SDT TA timer and/or TA timer (e.g., for one or multiple or all CG configuration(s)) may be (re-)started when a CG configuration (e.g., that corresponds to the timer) is initialized. The SDT TA timer and/or TA timer may be (re-)started when the subsequent transmission period is started.

The SDT TA timer and/or TA timer may be (re-)started when the UE transmits or retransmits an UL message. The UL message may be transmitted via the Msg1/Msg3/MsgA/CG resource/an UL resource scheduled by the Msg2/MsgB/Msg4 (e.g., during the SDT procedure). The UL message may include an RRC resume request message (e.g., an RRCResumeRequest or RRCResumeRequest1). The UL message may include small data (e.g., UL data associated with a specific SRB/DRB/LCH for SDT). The UL message may include a MAC CE (e.g., a BSR MAC CE). If the UL message is (re-)transmitted based on a CG resource/configuration, the timer that corresponds to the CG configuration may be (re-)started. If the UL message is transmitted on an UL resource scheduled by a dynamic grant, and the dynamic grant is used for the retransmission of a HARQ process was used for transmitting the UL data via the CG resource, the timer that corresponds to the CG configuration may be (re-)started.

The SDT TA timer and/or TA timer may be (re-)started when the UE receives a response from the NW. The response may be an Msg2/Msg4/MsgB and/or a response for an UL transmission via the CG resource. The response may be used for the contention resolution (e.g., for an RA procedure). The response may include an ACK/NACK (e.g., for a UL transmission via the CG resource). In this case, the timer corresponding to the CG configuration of the CG resource may be (re-)started. The response may include a UL grant/DL assignment for a new transmission/retransmission. The response may be a PDCCH addressed to an RNTI (e.g., a C-RNTI, a CS-RNTI, a dedicated RNTI, an RNTI for SDT, and/or an RNTI for CG). In this case, if the UL grant/DL assignment is for indicating a retransmission of a HARQ process which was used for transmitting the UL data via the CG resource, the timer that corresponds to the CG configuration may be (re-)started. The response may indicate a UL grant for a new transmission for the HARQ process used for the transmission of a UL transmission for small data (e.g., the UL message). The response may include a specific command (e.g., a TA command MAC CE). The response may be RRCResume, RRCSetup, RRCRelease, RRCRelease with SuspendConfig, RRCReestablishment, and/or RRCReject.

The SDT TA timer and/or TA timer may be (re-)started when the UE receives a PDCCH addressed to an RNTI (e.g., a C-RNTI, a CS-RNTI, a dedicated RNTI, an RNTI for SDT, and/or an RNTI for CG). The timer/time window may be (re-)started when the UE receives a downlink assignment (e.g., on PDCCH) and/or a DL message/data (e.g., on the PDSCH). The SDT TA timer and/or TA timer may be (re-)started when another timer (e.g., HARQ RTT timer) expires. The another timer may indicate a minimum duration before a DL assignment and/or UL HARQ retransmission grant is expected by the UE/MAC entity. The SDT TA timer and/or TA timer may be (re-)started after a configured offset. The configured offset may indicate a minimum duration before a DL assignment and/or UL HARQ retransmission grant is expected by the UE/MAC entity. The configured offset may be configured per CG configuration.

The SDT TA timer and/or TA timer may be stopped when the SDT procedure is terminated. The SDT TA timer and/or TA timer may be stopped when the RA procedure is stopped/aborted. The SDT TA timer and/or TA timer (for one or multiple or all CG configuration(s)) may be stopped when the corresponding CG configuration is released/suspended/cleared. The SDT TA timer and/or TA timer (for one or multiple or all CG configuration(s)) may be stopped when the corresponding CG configuration is considered as invalid (e.g., a TAT for the CG configuration expires). The SDT TA timer and/or TA timer may be stopped when the UE receives an indication from the NW. The indication may be RRCResume, RRCSetup, RRCRelease, RRCRelease with SuspendConfig, RRCReestablishment, and/or RRCReject. The indication may be a PDCCH addressed to an RNTI (e.g., a C-RNTI, a CS-RNTI, a dedicated RNTI, an RNTI for SDT, and/or an RNTI for CG). The indication may indicate the UE to terminate the SDT procedure and/or the subsequent transmission period (e.g., based on a field of the indication). The indication may indicate the UE to initiate an RRC procedure (e.g., an RRC connection resume procedure, RRC establishment procedure, and/or an RRC reestablishment procedure). The indication may indicate the UE to switch/fallback the types for SDT (e.g., the types may be RA-based SDT, CG-based SDT, 2-step RA, 4-step RA).

The SDT TA timer and/or TA timer may be stopped when the UE receives a response from the NW. The response may be an Msg2/Msg4/MsgB and/or a response for a UL transmission via the CG resource. The response may be used for contention resolution (e.g., for an RA procedure). The response may include an ACK/NACK (e.g., for a UL transmission via the CG resource). The response may include a UL grant/DL assignment for a new transmission/retransmission. The response may be a PDCCH addressed to an RNTI (e.g., a C-RNTI, a CS-RNTI, a dedicated RNTI, an RNTI for SDT, and/or an RNTI for CG). The response may indicate a UL grant for a new transmission for the HARQ process used for the transmission of a UL transmission for small data (e.g., the UL message). The response may include a specific command (e.g., a TA command MAC CE). The response may be RRCResume, RRCSetup, RRCRelease, RRCRelease with SuspendConfig, RRCReestablishment, and/or RRCReject.

The SDT TA timer and/or TA timer may be stopped upon a cell selection or a cell re-selection. The SDT TA timer and/or TA timer may be stopped when the UE moves to another RAT (e.g., E-UTRA). The SDT TA timer and/or TA timer may be stopped upon abortion of the connection establishment by the upper layers. The SDT TA timer and/or TA timer may be stopped upon a RAN notification area (RNA) update. The SDT TA timer and/or TA timer may be stopped when the UE changes the serving cell to another cell or when the UE camps on a new (suitable/acceptable) cell. For example, the timer may be stopped when/after the UE establishes/resumes an RRC connection from the RRC_INACTIVE state on a cell different from the cell where the CG configuration was provided. The SDT TA timer and/or TA timer may be stopped when the UE initiates an RRC re-establishment procedure. For example, the timer may be stopped when the UE sends an RRCReestablishmentRequest to the network. The SDT TA timer and/or TA timer may be stopped when the UE is indicated, by the network, to perform a carrier switching (e.g., from an NUL to a SUL or vice versa). The SDT TA timer and/or TA timer may be stopped when the UE is indicated, by the network, to perform a (UL/DL) BWP switching.

Upon expiry of the SDT TA timer and/or TA timer, the UE may enter an RRC_IDLE state. Upon expiry of the SDT TA timer and/or TA timer, the UE may stay in the RRC_INACTIVE state. Upon expiry of the SDT TA timer and/or TA timer, the UE may initiate an RRC establishment procedure (e.g., via an RRCSetupRequest). Upon expiry of the SDT TA timer and/or TA timer, the UE may initiate an RRC reestablishment procedure (e.g., via an RRCRestablishmentRequest). Upon expiry of the SDT TA timer and/or TA timer, the UE may initiate an RRC connection resume procedure (e.g., via an RRCResumeReques). Upon expiry of the SDT TA timer and/or TA timer, the UE may release/suspend a CG configuration (e.g., to which the timer corresponds). Upon expiry of the SDT TA timer and/or TA timer, the UE may perform a retransmission based on a CG resource/configuration (e.g., to which the timer corresponds).

SDT Assumptions

The SDT may be supported as a baseline for RA-based SDT and CG-based SDT schemes. The stored configuration in the UE Context may be used for the RLC bearer configuration. The 2-step RACH or the 4-step RACH may be applied to an RA-based SDT in the RRC_INACTIVE state. The UL small data may be sent in an MsgA of a 2-step RACH and/or an Msg3 of a 4-step RACH. The SDT may be configured by the network on a per RB (e.g., SRB/DRB) basis. The data volume threshold may be used for the UE to decide whether to perform/select an SDT procedure (e.g., initiate an SDT procedure, initiate an RA procedure for SDT, and/or initiate an SDT procedure with CG) or perform/select a non-SDT procedure (e.g., initiate an RA procedure for a CCCH logical channel). When the UE is in an RRC_INACTIVE state, the UE may send one or more UL and DL packets as part of the same SDT procedure and without transitioning to the RRC_CONNECTED state (e.g., the UE may remain in the RRC_INACTIVE state).

When the UE receives an RRC release message (e.g., with suspend configuration), the UE may perform the following actions (a)-(c).

(a) MAC entity may be reset, and default Radio bearer configuration may be released.

(b) RLC entities for SRB1 may be re-established.

(c) SRBs and DRBs may be suspended, except SRB0.

Upon initiating the SDT procedure (e.g., for the first transmission of small data), the UE may re-establish at least the PDCP entities (e.g., for SDT) and/or resume the RBs (e.g., for SDT). The first UL message of SDT (e.g., an Msg3 for a 4-step RACH, an MsgA payload for a 2-step RACH and/or the CG transmission) may include at least the following (a)-(d) (which may be depending on the size of the message).

(a) A CCCH message.

(b) Data from one or more RBs which are configured by the network for small data transmission.

(c) MAC CEs (e.g., BSR and PHR).

(d) Padding bits.

The LCP may be used to determine the priority of the following (a)-(c).

(a) Data from one or more RBs which are configured by the network for small data transmission.

(b) MAC CEs (e.g., BSR and PHR).

(c) Padding bits.

The CCCH message may include ResumeMAC-I generated using the stored security key for RRC integrity protection. New keys may be generated using the stored security context and the NCC value received in the previous RRC Release message, and the new keys may be used for generating the data of RBs that are configured for SDT.

For a CG-based SDT, the configuration of a CG resource for uplink small data transmission may be included in the RRC Release message. For a CG-based SDT, a TA timer (e.g., cg-SDT-TimeAlignmentTimer) for the TA maintenance specified for a CG based small data transmission in the RRC_INACTIVE state may be applied. The TA timer may be configured together with the CG configuration in the RRC Release message. For a CG-based SDT, the configuration of a CG resource for small data transmission may be valid only in the same serving cell (e.g., the configuration of the CG resource for small data transmission may be invalid if the UE camps on another cell). For the CG-based SDT, the UE may use a CG-based small data transmission if at least one of the following criteria (a)-(c) is fulfilled. (a) the user data is smaller than a data volume threshold; (b) the CG resource is configured and valid; (c) the UE has a valid TA.

For a CG-based SDT, an association between the CG resources and the SSBs may be required for a CG-based SDT. For a CG-based SDT, an SS-RSRP threshold may be configured for the SSB selection. The UE may select one of the SSBs with an SS-RSRP above the threshold and may select the associated CG resource for the UL data transmission. For a CG-based SDT, the CG-SDT resource configuration may be provided to the UEs that are in the RRC_CONNECTED state, for example, via the RRC Release message. For a CG-based SDT, the CG resources (e.g., PUSCH resources) may be separately configured for the NUL and the SUL. For a CG-based SDT, the RRC Release message may be used to reconfigure or release the CG-SDT configuration/resources while the UE is in the RRC_INACTIVE state.

For a CG-based SDT, the subsequent data transmission may use the CG resource or DG (e.g., dynamic grant addressed to UE's C-RNTI/CS-RNTI). The C-RNTI/CS-RNTI may be the same as the previous C-RNTI/CS-RNTI or may be configured explicitly by the network. For a CG-based SDT, a TA timer (e.g., cg-SDT-TimeAlignmentTimer) may be started upon receiving the TA configuration from a gNB, e.g., via an RRC release message, and may be (re) started upon reception of a TA command. For a CG-based SDT, the UE may release the CG configuration/resources when the TAT expires (e.g., while the UE is in the RRC_INACTIVE state). For an RA-based SDT, up to two preamble groups (e.g., corresponding to two different payload sizes for the MsgA/Msg3) may be configured by the network. For an RA-based SDT, upon a successful completion of the contention resolution, the UE may monitor the C-RNTI.

For an RA-based SDT, a RACH resource, e.g., (RO+ preamble combination), may be different between an SDT (e.g., RA for SDT) and a non-SDT (e.g., RA for CCCH or RA for RRC connection resume). For an RA-based SDT, the RRC Release message may be sent at the end to terminate the SDT procedure (e.g., from RRC point of view). The RRC Release message sent at the end of the SDT may include the CG resource. An RSRP threshold (e.g., sdt-RSRP-Threshold) may be used to select between an SDT (e.g., initiate SDT procedure, initiate RA procedure for SDT, and/or initiate SDT procedure with CG) and a non-SDT procedure (e.g., initiate RA procedure for CCCH logical channel). For an SDT, the UE may perform UL carrier selection (e.g., UL and SUL selection).

If the CG-SDT resources are configured on the selected UL carrier and are valid, the CG-based SDT may be selected to perform. If the 2-step RA resources (e.g., for SDT) are configured on the UL carrier and criteria to select 2-step RA (e.g., for SDT) is met, the 2-step RA type (e.g., for SDT) may be selected. If 4-step RA resources (e.g., for SDT) are configured on the UL carrier and criteria to select 4-step RA (e.g., for SDT) is met, the 4-step RA type may be selected. The UE may not perform the SDT procedure (e.g., the UE may perform the RRC connection resume procedure). If both 2-step RA (e.g., for SDT) and 4-step RA resources (e.g., for SDT) are configured on the UL carrier, RA type selection (e.g., 2-step and 4-step RA type selection) may performed based on an RSRP threshold (e.g., sdt-MSGA-RSRP-Threshold).

Besides the DRB, SRB1 and SRB2 may be configured for SDT (e.g., for carrying RRC and/or NAS messages). Upon initiating the SDT procedure and/or RRC resume procedure for SDT initiation (e.g., for the first SDT transmission), the UE may resume the SRB (e.g., SRB1, SRB2, and/or SRB3) that is configured for SDT (e.g., in addition to the SDT DRBs that are configured for SDT). A specific search space may be supported for monitoring the PDCCH addressed to the C-RNTI after a successful completion of the RACH procedure during the RA-SDT.

An RSRP threshold (e.g., sdt-RSRP-Threshold) may be used to select between an SDT and a non-SDT procedure, if configured (e.g., RSRP may refer to the same RSRP that is measured for carrier selection). An RSRP threshold (e.g., sdt-RSRP-Threshold) to select between an SDT and a non-SDT procedure may be used for both CG-SDT and RA-SDT. An RSRP threshold (e.g., sdt-RSRP-Threshold) to select between an SDT and a non-SDT procedure may be the same for both the CG-SDT and the RA-SDT. An RSRP threshold for carrier selection (e.g., sdt-RSRP-ThresholdSSB-SUL) may be specific to the SDT (e.g., separately configured for SDT). This may be optional for the network. An RSRP threshold for the RA type selection (e.g., sdt-MSGA-RSRP-Threshold) may be specific to the SDT (e.g., separately configured for SDT).

A Data volume threshold (e.g., sdt-DataVolumeThreshold) may be the same for the CG-SDT and the RA-SDT. Switching/fallback from the SDT procedure to the non-SDT procedure (e.g., an RRC connection resume procedure) may be applied based on some criteria. A switching/fallback from the CG-SDT to the RA-SDT may be applied based on some criteria. The UE may switch from the SDT procedure to the non-SDT procedure (e.g., an RRC connection resume procedure) in the following cases (a) and (b).

(a): UE receives indication from the network to switch to the non-SDT procedure. For example, the network may send an RRC Resume message, and/or may send an indication in the RAR/fallbackRAR/DCI to switch to the non-SDT procedure.

(b): Initial UL transmission (in MsgA/Msg3/CG resources) fails for a (configured) number of times.

The UE may perform a PDCP re-establishment implicitly (e.g., without explicit indication for the PDCP re-establishment), when the UE initiates the SDT procedure. The SR resource (e.g., a PUCCH resource for SR) may not be configured for SDT. When the BSR is triggered by SDT data, the UE may trigger an RA because the SR resource is not available. An SDT failure detection timer may be started upon initiation of the SDT procedure. Upon an SDT failure detection timer expiry, the UE may transition to an RRC_IDLE state and/or mat attempt an RRC connection setup. The CG resources for SDT may be configured at the same time on the NUL and SUL. The UE may start a timer after a UL transmission (e.g., for CG-SDT). The CG resources for SDT may be configured on the BWPs, other than the initial BWP. The CG resources per CG configuration may be associated with a set of SSB(s) configured by explicit signaling.

The specific search space may be a common search space to the UEs performing the RA-SDT. A UE-specific search space may be configured for the UEs that perform the CG-SDT. The UE may monitor the paging after the UE initiates an SDT for the system information change and/or for a Public Warning System (PWS). For a CG-based SDT, the SSB-to-PUSCH resource mapping within the CG configuration may be implicitly defined. The ordering of the SSB and CG PUSCH resources may be captured in RAN1 specification (e.g., as specified in 3GPP TS 38.213). A PUSCH resource may refer to a transmission occasion and a DMRS resource used for the PUSCH transmission.

The SSB subset for RSRP based TA validation may be determined at least based on a configured absolute RSRP threshold. The SSB subset may be (a) within a set of SSBs configured per CG configuration, (b) within a set of SSBs configured for all CG configurations, (c) within a set of all SSBs actually transmitted as indicated in SIB1, or (d) highest N SSBs that are measured to derive the subset for a UE across all CG configurations.

Data volume used for SDT selection criteria may be calculated as the total sum of Buffer Size across SDT RBs. For example, the UE may determine the amount of UL data available for a logical channel according to the data volume calculation procedure as specified in the 3GPP TS 38.322 and 3GPP TS 38.323.

Table 3 below shows an example of data volume calculation as specified in the 3GPP TS 38.322.

TABLE 3

For the purpose of MAC buffer status reporting, the UE shall consider the following as
RLC data volume:
- RLC SDUs and RLC SDU segments that have not yet been included in an RLC data PDU;
- RLC data PDUs that are pending for initial transmission;
- RLC data PDUs that are pending for retransmission (RLC AM).

Table 4 below shows an example of data volume calculation as specified in the 3GPP TS 38.323.

TABLE 4

For the purpose of MAC buffer status reporting, the transmitting PDCP entity shall consider the following as PDCP data volume:
- the PDCP SDUs for which no PDCP Data PDUs have been constructed;
- the PDCP Data PDUs that have not been submitted to lower layers;
- the PDCP Control PDUs;
- for AM DRBs, the PDCP SDUs to be retransmitted;
- for AM DRBs, the PDCP Data PDUs to be retransmitted.

At initiation of an SDT procedure, the PDCP status report may not be triggered even if the RB is configured with statusReportRequired. The RRC layer may indicate to the PDCP layer to disable the PDCP status report, e.g., by de-configuring statusReportRequired (e.g., UE internally indicates). For an SDT procedure selection, same data volume threshold may be used for the CG-SDT and the RA-SDT. The BSR configuration used for the SDT may be different from the BSR configuration used in the RRC_CONNECTED state. The UE may perform an RLC re-establishment implicitly (e.g., without explicit indication for RLC re-establishment), when the UE initiates the SDT procedure.

During the SDT procedure, all the triggered PHRs may be cancelled if all the SDT data are included in the UL grant, and if there is no room in the MAC PDU to fit the PHR. The LCH restrictions may be applied, reusing existing signaling. The PDCP entities of only the non-SDT RBs may be re-established (e.g., not for the SDT RBs) when the UE transitions from the RRC_INACTIVE state, with an ongoing SDT session, to the RRC CONNECTED state. Events that trigger a termination or failure of an ongoing SDT session/procedure may be the following (a)-(c).

(a) A cell reselection.
(b) The expiry of the SDT failure detection timer.
(c) When the Max retx is reached in the RLC. The RLC AM max retransmission functionality may remain unchanged.

When a UE detects a failure of an ongoing SDT session/procedure, the UE may transition autonomously into the RRC_IDLE state. The SDT related RACH resources may be configured via the system information (e.g., SIB1). At least the following parameters (a)-(c) may be RA-SDT specific.

(a) SSB selection related parameters (e.g., rsrp-ThresholdSSB, msgA-RSRP-ThresholdSSB).
(b) Power control related parameters (e.g., preambleReceivedTargetPower/gA-PreambleReceivedTargetPower, powerRampingStep/msgA-PreamblePowerRampingStep, msg3-DeltaPreamble/msgA-DeltaPreamble).
(c) Preamble group related parameters (e.g., msg3-DeltaPreamble/msgA-DeltaPreamble, messagePowerOffsetGroupB for 2-step RA-SDT and 4-step RA-SDT).

For a shared ROs case, all the following configurations (a)-(c) may be allowed.

(a) 4-step RA-SDT shares ROs with 4-step RA and/or 2-step RA.
(b) 2-step RA-SDT shares Ros with 4-step RA and/or 2-step RA.
(c) 2-step RA-SDT shares ROs with 4-step RA-SDT and/or 4-step RA and/or 2-step RA.

For the RA-SDT preamble group selection, the UE may consider the SDT data size plus MAC subheader in addition to the CCCH SDU size plus MAC subheader and pathloss. The fallbackRAR reception as the legacy 2-step RACH may be supported in a 2-step RA-SDT (e.g., fallback from a 2-step RA-SDT to a 4-step RA-SDT when fallbackRAR is received). The UE may be configured to switch from the 2-step RA-SDT to the 4-step RA-SDT after N times of MsgA transmission. The PUCCH resources may be used for HARQ-ACK during the subsequent SDT transmissions (e.g., applicable for both RA and CG). The UE may suspend all the UL transmissions and may trigger a RACH if any UL transmission is needed when the TAT expires during an RA-SDT procedure. The RA-SDT may be configured on an initial BWP or a non-initial BWP. The UE may select any SSB if there is no qualified SSB for the RA-SDT, for example, similar to the legacy. If none of the SSBs' RSRPs is above the RSRP threshold of CG-SDT criteria in the type selection phase, the UE may select the RA-SDT if the RA-SDT criteria is met.

During a subsequent CG transmission phase (e.g., after the UE has received response from the NW), the UE may initiate at least a legacy RACH procedure (e.g., trigger due to no UL resources) based on one or more of the following conditions (a)-(c).

(a) no qualified SSB when the evaluation is performed.
(b) when TA is invalid.
(c) when SR is triggered due to lack of UL resource.

The UE may release a CG-SDT resource (e.g., if stored at the UE) when the UE initiates an RRC resume procedure from another cell which is different from the cell in which the RRC Release message is received. The C-RNTI previously configured in the RRC_CONNECTED state may be used for the UE to monitor the PDCCH in the CG-SDT. The CS-RNTI based dynamic retransmission mechanism may be reused for the CG-SDT. The CS-RNTI may be the same one as the one previously configured in the RRC_CONNECTED state or a new CS-RNTI provided to the UE.

During a subsequent new CG transmission phase, for the purpose of the CG resource selection, the UE may re-evaluate the SSB for the subsequent CG transmission. At least the following parameters (a)-(c) may be included in the CG-SDT configuration.

(a) The new TA timer in RRC_INACTIVE.

(b) The RSRP change threshold for TA validation mechanism in SDT (details dependent on RAN1).

(c) The SSB RSRP threshold for beam selection (e.g., UE selects the beam and associated CG resource for data transmission).

Each N of consecutive SSB indexes associated with one CG configuration may be mapped to valid CG PUSCH resources. For example, in increasing order of DMRS resource indexes, where a DMRS resource index DMRSid is determined first in an ascending order of a DMRS port index and second in an ascending order of a DMRS sequence index. For example, in increasing order of the CG period indexes in the association period.

The mapping ratio N may be explicitly signaled and the association period may be implicitly derived. The SSB to CG PUSCH association period may be the duration of multiple CG periods depending on the smallest time duration in a set determined by the CG period, such that all SSBs associated with the CG configuration may be mapped at least once to the CG PUSCH resources. An association pattern period may include one or more association periods and may be determined so that a pattern between the CG PUSCH occasions and the SS/PBCH block indexes associated with the CG configuration may repeat at most every 640 msec.

The following PUSCH occasion validation rules may be applied for the CG-SDT. For an unpaired spectrum and for the SS/PBCH blocks with indexes provided by ssb-PositionsInBurst in SIB1 or by ServingCellConfigCommon, (a) if a UE is provided with the tdd-UL-DL-ConfigurationCommon, the valid PO may be the PO in the UL part in a slot, or at least Ngap symbols after the end of the DL part in a slot, or after the end of the SSB in a slot, (b) if a UE is not provided with the tdd-UL-DL-ConfigurationCommon, the valid PO may not precede an SS/PBCH block in the PUSCH slot, start at least Ngap symbols after the last SS/PBCH block symbol, (c) Ngap may be provided, for example, as specified in the 3GPP TS 38.213.

Figure 5:
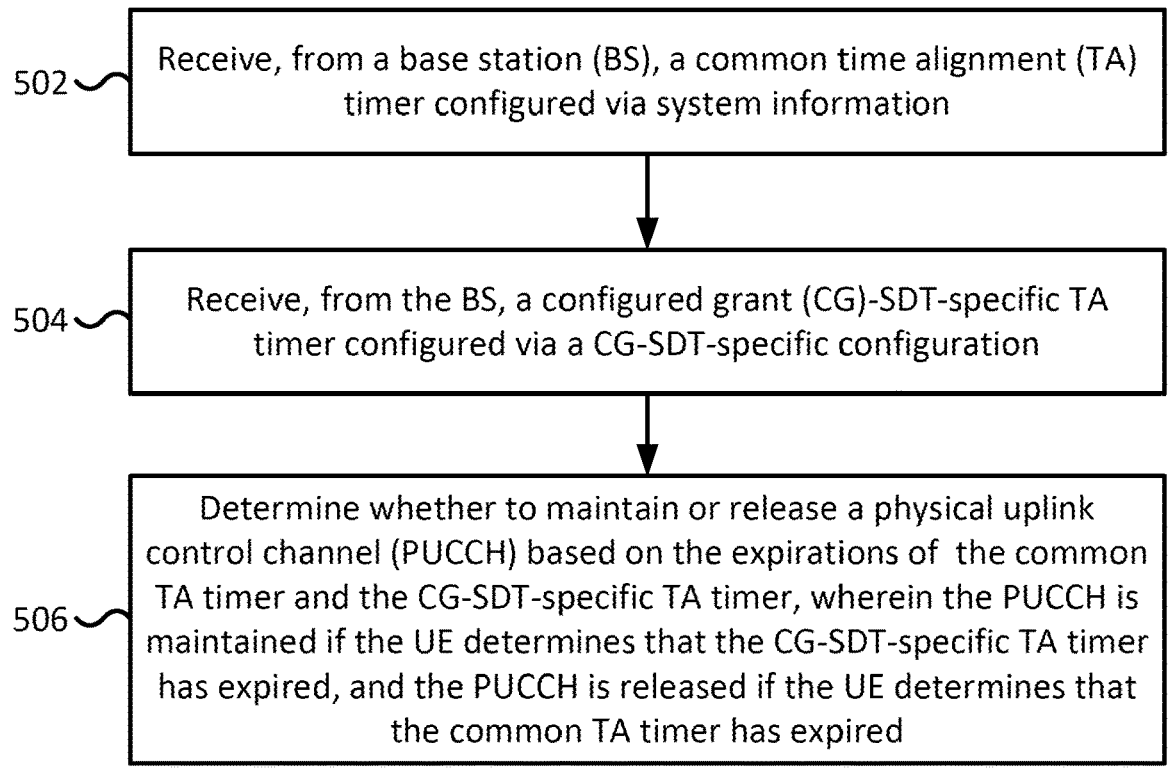
FIG. 5 is a flowchart illustrating a method performed by a UE for SDT, according to an example implementation of the present disclosure.

FIG. 5 is a flowchart illustrating a method 500 performed by a UE for LCH configuration for SDT, according to an example implementation of the present disclosure. Although actions 502, 504, 506, and 508 are illustrated as separate actions represented as independent blocks in FIG. 5, these separately illustrated actions should not be construed as necessarily order-dependent. The order in which the actions are performed in FIG. 5 is not intended to be construed as a limitation, and any number of the disclosed blocks may be combined in any order to implement the method, or an alternate method. Moreover, each of actions 502, 504, 506, and 508 may be performed independently of other actions and can be omitted in some implementations of the present disclosure.

In action 502, the UE may receive, from a base station (BS), a common time alignment (TA) timer configured via system information. In some implementations, the system information may be configured via an information element (IE) UplinkConfigCommonSIB.

In action 504, the UE may receive, from the BS, a configured grant (CG)-SDT-specific TA timer configured via a CG-SDT-specific configuration. In some implementations, the CG-SDT-specific configuration may be included in an SDT configuration. In some implementations, the SDT configuration may be included in a suspend configuration. In some implementations, the suspend configuration is included in a radio resource control (RRC) release message.

In action 506, the UE may determine whether to maintain or release a physical uplink control channel (PUCCH) based on the expirations of the common TA timer and the CG-SDT-specific TA timer. The PUCCH may be maintained if the UE determines that the CG-SDT-specific TA timer has expired, and the PUCCH may be released if the UE determines that the common TA timer has expired.

In some implementations, a medium access control (MAC) layer of the UE may notify a radio resource control (RRC) layer of the UE to release the PUCCH in a case the UE determines that the common TA timer has expired. In some implementations, the UE may flush all hybrid automatic repeat request (HARQ) buffers in a case the UE determines that either of the common TA timer or the CG-SDT-specific TA timer has expired. In some implementations, the UE may determine whether to generate an acknowledgement of data based on the common TA timer and the CG-SDT-specific TA timer. In some implementations, the UE may generate the acknowledgement of the data in a case the UE determines that either of the common TA timer or the CG-SDT-specific TA timer is running, and not generate the acknowledgement of the data in a case the UE determines that none of the common TA timer and the CG-SDT-specific TA timer is running. In some implementations, a medium access control (MAC) layer of the UE may instruct a physical layer of the UE to generate the acknowledgement of the data in a case the UE determines that either of the common TA timer or the CG-SDT-specific TA timer is running. In some implementations, the UE may transition to a radio resource control (RRC)_IDLE state in a case the UE determines that the CG-SDT-specific TA timer has expired.

In the present disclosure, the PUCCH resource for the non-SDT transmission is maintained (e.g., not released) when the UE determines that the CG-SDT-specific TA timer has expired. As such, efficient utilization of the PUCCH resource for the non-SDT transmission can be achieved, since the PUCCH resource for the non-SDT transmission is not affected by SDT procedure.

Figure 6:
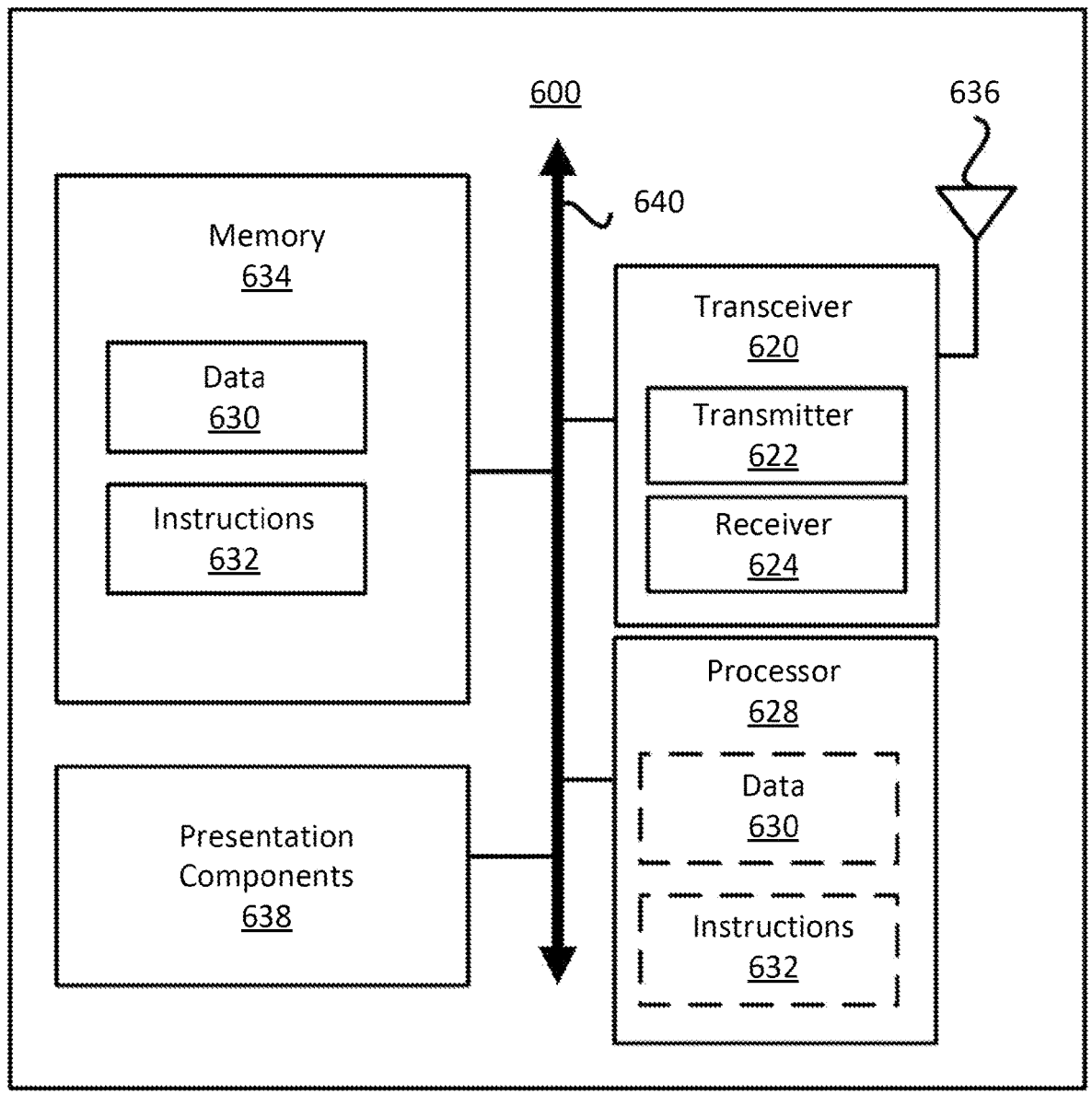
FIG. 6 is a block diagram illustrating a node for wireless communication, according to an example implementation of the present disclosure.

FIG. 6 is a block diagram illustrating a node 600 for wireless communication, according to an example implementation of the present disclosure. As illustrated in FIG. 6, a node 600 may include a transceiver 620, a processor 628, a memory 634, one or more presentation components 638, and at least one antenna 636. The node 600 may also include a radio frequency (RF) spectrum band module, a BS communications module, a network communications module, and a system communications management module, Input/Output (I/O) ports, I/O components, and a power supply (not illustrated in FIG. 6).

Each of the components may directly or indirectly communicate with each other over one or more buses 640. The node 600 may be a UE or a BS that performs various functions disclosed with reference to FIGS. 1-5.

The transceiver 620 has a transmitter 622 (e.g., transmitting/transmission circuitry) and a receiver 624 (e.g., receiving/reception circuitry) and may be configured to transmit and/or receive time and/or frequency resource partitioning information. The transceiver 620 may be configured to transmit in different types of subframes and slots including, but not limited to usable, non-usable, and flexibly usable subframes and slot formats. The transceiver 620 may be configured to receive data and control channels.

The node 600 may include a variety of computer-readable media. Computer-readable media may be any available media that may be accessed by the node 600 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared, and other wireless media. Combinations of any of the previously listed components should also be included within the scope of computer-readable media.

The memory 634 may include computer-storage media in the form of volatile and/or non-volatile memory. The memory 634 may be removable, non-removable, or a combination thereof. Example memory may include solid-state memory, hard drives, optical-disc drives, etc. As illustrated in FIG. 6, the memory 634 may store a computer-readable and/or computer-executable program 632 (e.g., software codes) that are configured to, when executed, cause the processor 628 to perform various functions disclosed herein, for example, with reference to FIG. 5. Alternatively, the program 632 may not be directly executable by the processor 628, but may be configured to cause the node 600 (e.g., when compiled and executed) to perform various functions disclosed herein.

The processor 628 (e.g., having processing circuitry) may include an intelligent hardware device (e.g., a Central Processing Unit (CPU), a microcontroller, an ASIC, etc). The processor 628 may include memory. The processor 828 may process the data 630 and the program 632 received from the memory 634, and information transmitted and received via the transceiver 620, the base band communications module, and/or the network communications module. The processor 628 may also process information to send to the transceiver 620 for transmission via the antenna 636 to the network communications module for transmission to a CN.

One or more presentation components 638 may present data indications to a person or another device. Examples of presentation components 638 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method performed by a user equipment (UE) for small data transmission (SDT), the method comprising:
    receiving, from a base station (BS), a common time alignment (TA) timer configured via system information;
    receiving, from the BS, a configured grant (CG)-SDT-specific TA timer configured via a CG-SDT-specific configuration; and
    determining whether to maintain or release a physical uplink control channel (PUCCH) based on expirations of the common TA timer and the CG-SDT-specific TA timer, wherein:
    the PUCCH is maintained if the UE determines that the CG-SDT-specific TA timer has expired, and
    the PUCCH is released if the UE determines that the common TA timer has expired.

2. The method of claim 1, further comprising:
    notifying, by a medium access control (MAC) layer of the UE, a radio resource control (RRC) layer of the UE to release the PUCCH in a case the UE determines that the common TA timer has expired.

3. The method of claim 1, further comprising:
    flushing all hybrid automatic repeat request (HARQ) buffers in a case the UE determines that either of the common TA timer or the CG-SDT-specific TA timer has expired.

4. The method of claim 1, further comprising:
    determining whether to generate an acknowledgement of data based on the common TA timer and the CG-SDT-specific TA timer;
    generating the acknowledgement of the data in a case the UE determines that either of the common TA timer or the CG-SDT-specific TA timer is running; and
    forgoing generating the acknowledgement of the data in a case the UE determines that none of the common TA timer and the CG-SDT-specific TA timer is running.

5. The method of claim 4, further comprising:
    instructing, by a medium access control (MAC) layer of the UE, a physical layer of the UE to generate the acknowledgement of the data in the case the UE determines that either of the common TA timer or the CG-SDT-specific TA timer is running.

6. The method of claim 1, further comprising:
    transitioning to a radio resource control (RRC)_IDLE state in a case the UE determines that the CG-SDT-specific TA timer has expired.

7. The method of claim 1, wherein the system information is configured via an information element (IE) UplinkConfigCommonSIB.

8. The method of claim 1, wherein the CG-SDT-specific configuration is included in an SDT configuration.

9. The method of claim 8, wherein the SDT configuration is included in a suspend configuration.

10. The method of claim 9, wherein the suspend configuration is included in a radio resource control (RRC) release message.

11. A user equipment (UE) for performing small data transmission (SDT), the UE comprising:
- one or more non-transitory computer-readable media storing computer-executable instructions; and
- at least one processor coupled to the one or more non-transitory computer-readable media, the at least one processor configured to execute the computer-executable instructions to:
- receive, from a base station (BS), a common time alignment (TA) timer configured via system information;
- receive, from the BS, a configured grant (CG)-SDT-specific TA timer configured via a CG-SDT-specific configuration; and
- determine whether to maintain or release a physical uplink control channel (PUCCH) based on expirations of the common TA timer and
- the CG-SDT-specific TA timer, wherein:
- the PUCCH is maintained if the UE determines that the CG-SDT-specific TA timer has expired, and
- the PUCCH is released if the UE determines that the common TA timer has expired.

12. The UE of claim 11, wherein the at least one processor is further configured to execute the computer-executable instructions to:
- notify, by a medium access control (MAC) layer of the UE, a radio resource control (RRC) layer of the UE to release the PUCCH in a case the UE determines that the common TA timer has expired.

13. The UE of claim 11, wherein the at least one processor is further configured to execute the computer-executable instructions to:
- flush all hybrid automatic repeat request (HARQ) buffers in a case the UE determines that either of the common TA timer or the CG-SDT-specific TA timer has expired.

14. The UE of claim 11, wherein the at least one processor is further configured to execute the computer-executable instructions to:
- determine whether to generate an acknowledgement of data based on the common TA timer and the CG-SDT-specific TA timer,
- generate the acknowledgement of the data in a case the UE determines that either of the common TA timer or the CG-SDT-specific TA timer is running, and
- forgo generating the acknowledgement of the data in a case the UE determines that none of the common TA timer and the CG-SDT-specific TA timer is running.

15. The UE of claim 14, wherein the at least one processor is further configured to execute the computer-executable instructions to:
- instruct, by a medium access control (MAC) layer of the UE, a physical layer of the UE to generate the acknowledgement of the data in the case the UE determines that either of the common TA timer or the CG-SDT-specific TA timer is running.

16. The UE of claim 11, wherein the at least one processor is further configured to execute the computer-executable instructions to:
- transition to a radio resource control (RRC)_IDLE state in a case the UE determines that the CG-SDT-specific TA timer has expired.

17. The UE of claim 11, wherein the system information is configured via an information element (IE) UplinkConfigCommonSIB.

18. The UE of claim 11, wherein the CG-SDT-specific configuration is included in an SDT configuration.

19. The UE of claim 18, wherein the SDT configuration is included in a suspend configuration.

20. The UE of claim 19, wherein the suspend configuration is included in a radio resource control (RRC) release message.

* * * * *